United States Patent
Tada et al.

(10) Patent No.: US 12,503,480 B2
(45) Date of Patent: Dec. 23, 2025

(54) CYCLIC PHOSPHAZENE COMPOUND HAVING OXAPHOSPHORIN RING-CONTAINING STRUCTURE

(71) Applicant: FUSHIMI PHARMACEUTICAL CO., LTD., Marugame (JP)

(72) Inventors: Yuji Tada, Marugame (JP); Atsushi Sunada, Marugame (JP); Keiichiro Utsumi, Marugame (JP)

(73) Assignee: FUSHIMI PHARMACEUTICAL CO., LTD., Marugame (JP)

( * ) Notice: Subject to any disclaimer, the term of this patent is extended or adjusted under 35 U.S.C. 154(b) by 568 days.

(21) Appl. No.: 18/016,756

(22) PCT Filed: Jun. 19, 2021

(86) PCT No.: PCT/JP2021/023280
§ 371 (c)(1),
(2) Date: Jan. 18, 2023

(87) PCT Pub. No.: WO2022/019021
PCT Pub. Date: Jan. 27, 2022

(65) Prior Publication Data
US 2023/0339994 A1 Oct. 26, 2023

(30) Foreign Application Priority Data
Jul. 22, 2020 (JP) .................. 2020-125556

(51) Int. Cl.
*C07F 9/6584* (2006.01)
*C08K 5/5399* (2006.01)

(52) U.S. Cl.
CPC .......... *C07F 9/6584* (2013.01); *C08K 5/5399* (2013.01)

(58) Field of Classification Search
CPC .......................... C07F 9/6584; C08K 5/5399
See application file for complete search history.

(56) References Cited

U.S. PATENT DOCUMENTS

| | | | |
|---|---|---|---|
| 3,865,783 A | 2/1975 | Clutter | |
| 5,639,808 A | 6/1997 | Coggio et al. | |
| 2017/0197998 A1 | 7/2017 | Pan | |
| 2019/0367727 A1 | 12/2019 | Liu et al. | |
| 2020/0071477 A1 | 3/2020 | Liu et al. | |
| 2020/0181403 A1 | 6/2020 | Suzuki et al. | |
| 2021/0395488 A1 | 12/2021 | Nantaku et al. | |

FOREIGN PATENT DOCUMENTS

| | | | | |
|---|---|---|---|---|
| CN | 107353306 A | * | 11/2017 | ............. H01G 11/64 |
| CN | 108250676 A | | 7/2018 | |
| CN | 110204862 A | | 9/2019 | |
| GB | 2 304 716 A | | 3/1997 | |
| JP | 8-225714 A | | 9/1996 | |
| JP | 2012-116842 A | | 6/2012 | |
| JP | 2013-75940 A | | 4/2013 | |
| JP | 2014-189489 A | | 10/2014 | |
| JP | 2017-122077 A | | 7/2017 | |
| JP | 2019-23263 A | | 2/2019 | |
| JP | 2019-44031 A | | 3/2019 | |
| JP | 2019-531262 A | | 10/2019 | |
| TW | 201542575 A | | 11/2015 | |
| TW | 202021975 A | | 6/2020 | |

(Continued)

OTHER PUBLICATIONS

International Search Report (PCT/ISA/210), issued in PCT/JP2021/023280, dated Aug. 24, 2021.
Tada et al., "Synthesis of Trispirocyclotriphosphazenes with Oxaphosphorine Rings and Their Crystal and Molecular Structures", Inorganic Chemistry, 2021, vol. 60, pp. 5014-5020.
Written Opinion of the International Searching Authority (PCT/ISA/237), issued in PCT/JP2021/023280, dated Aug. 24, 2021.

(Continued)

*Primary Examiner* — Vickey Nerangis
(74) *Attorney, Agent, or Firm* — Birch, Stewart, Kolasch & Birch, LLP

(57) ABSTRACT

A novel cyclic phosphazene compound that is represented by Formula (1) and is useful as a flame retardant of a resin material can enhance flame retardancy of the resin material and achieve good dielectric properties while suppressing deterioration in physical properties. In Formula (1), n is an integer of 3 to 8. $R^1$ and $R^2$ are (i) each independently a nitro group, either an alkyl group or an alkoxy group having 1 to 8 carbon atoms in which an alkyl group having 1 to 6 carbon atoms or an aryl group may be substituted, or an either aryl group or an aryloxy group having 6 to 20 carbon atoms in which an alkyl group having 1 to 6 carbon atoms or an aryl group may be substituted; or (ii) forming, in-between them, a saturated or an unsaturated cyclic structure that may be substituted with an alkyl group having 1 to 6 carbon atoms or a carbonyl group. a and b are each independently an integer of 0 to 4. The type of the oxaphosphorin ring-containing structure of each repeating unit is independent.

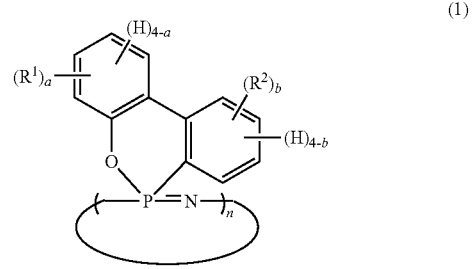

14 Claims, No Drawings

(56) References Cited

FOREIGN PATENT DOCUMENTS

WO   WO 2019/198766 A1   10/2019
WO   WO 2020/004440 A1   1/2020

OTHER PUBLICATIONS

Chinese Office Action and Search Report for Chinese Application No. 202180050087.1, dated Sep. 25, 2024.
English translation of the Written Opinion of the International Searching Authority for International Application No. PCT/JP2021/023280, dated Aug. 24, 2021.
Extended European Search Report for European Application No. 21845539.2, dated Oct. 15, 2024.
Meyer et al., "Preparation of 1,3,5-Trimethyl-4,6-dioxo-1,3,5,2X3-triazaphosphinanes; Single Crystal X-Ray Diffraction Study of a Platinum (II)-Complex," Chemical Sciences , 1992, pp. 517-525.
Neda et al., "Reactions of 2-Chloro- and 2-Organoamino-Substituted 5,6-Benzo-1,3-dimethyl-1,3,2-diazaphosphorinane-4-ones with Azides," Chemical Sciences, 1994, pp. 171-175.
Taiwanese Office Action and Search Report for Taiwanese Application No. 110123596, dated Nov. 4, 2024.

\* cited by examiner

CYCLIC PHOSPHAZENE COMPOUND HAVING OXAPHOSPHORIN RING-CONTAINING STRUCTURE

TECHNICAL FIELD

The present invention relates to a cyclic phosphazene compound having an oxaphosphorin ring-containing structure, particularly to a cyclic phosphazene compound having a specific oxaphosphorin ring-containing structure.

BACKGROUND ART

Materials used in a large-capacity and high-speed communication device that plays a role in the fifth generation high-speed mobile communication system (5G) and the high-speed mobile communication system of the next generation of 5G are required to simultaneously satisfy, as dielectric properties, a low dielectric constant (Dk) capable of reducing a delay in signal propagation and a low dielectric loss tangent (Df) capable of reducing signal attenuation (so-called Low Dk/Df). Various resin materials have been proposed as materials capable of achieving Low Dk/Df, but resin materials, which are generally flammable, are usually required to have flame retardancy by addition of a flame retardant.

However, while a flame retardant can enhance the flame retardancy of a resin material, it may change the physical properties of the resin material to deteriorate its mechanical, electrical, or dielectric properties. For example, Patent Documents 1 to 3 describe a phosphine oxide as a flame retardant incompatible with resin, and this phosphine oxide is interpreted as being capable of achieving Low Dk/Df of a resin material. However, since the phosphine oxide has a low content of phosphorus atoms related to the flame retardant mechanism of the resin material, it is necessary to increase the amount of phosphine oxide added to the resin material in order to achieve necessary flame retardancy. In addition, since mixing of a trace amount of chloride ions in the resin material cannot be avoided from the viewpoint of the production method of phosphine oxide, the chloride ions may deteriorate the electrical properties of the resin material when the amount of phosphine oxide added to the resin material is increased.

In addition, Patent Documents 4 to 7 describe trioxybiphenylcyclotriphosphazenes as flame retardants, and these phosphazene compounds are considered to have a high melting point and be capable of achieving Low Dk/Df.

However, these phosphazene compounds are synthesized using chlorocyclotriphosphazene as a starting material, and thus unsubstituted chlorine may remain in the phosphazene ring. The trioxybiphenylcyclotriphosphazenes may become degraded in terms of the stability over time in the resin material because the remaining chlorine in the phosphazene ring is converted into a P—OH group through hydrolysis, and may deteriorate the electrical properties of the resin material.

PRIOR ART DOCUMENTS

Patent Documents

Patent Document 1: Taiwan Patent Laid-open Publication No. 2015/42575
Patent Document 2: Japanese Patent Laid-open Publication No. 2019-023263
Patent Document 3: Japanese Patent Laid-open Publication No. 2019-044031
Patent Document 4: International Patent Publication No. 2019/198766
Patent Document 5: US Patent Laid-open Publication No. 2019/0367727
Patent Document 6: Chinese Patent Laid-open Publication No. 110204862
Patent Document 7: US Patent Laid-open Publication No. 2020/0071477

SUMMARY OF THE INVENTION

Problems to be Solved by the Invention

The present invention is intended to realize a novel cyclic phosphazene compound useful as a flame retardant for a resin material, particularly a novel cyclic phosphazene compound capable of enhancing flame retardancy while suppressing deterioration of physical properties of a resin material and achieving Low Dk/Df.

Solutions to the Problems

The cyclic phosphazene compound of the present invention is a cyclic phosphazene compound having an oxaphosphorin ring-containing structure, and is represented by the following Formula (1).

[Chemical Formula 1]

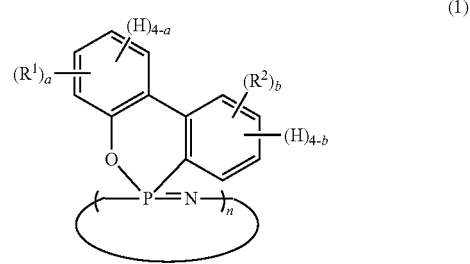

In Formula (1), n is an integer of 3 to 8. $R^1$ and $R^2$ are (i) each independently any one of the groups of a nitro group, an alkyl group or an alkoxy group having 1 to 8 carbon atoms in which at least one group selected from the group consisting of alkyl groups having 1 to 6 carbon atoms and aryl groups may be substituted, and an aryl group or an aryloxy group having 6 to 20 carbon atoms in which at least one group selected from the group consisting of alkyl groups having 1 to 6 carbon atoms and aryl groups may be substituted; or (ii) forming, in-between them, a saturated or an unsaturated cyclic structure that may be substituted with an alkyl group having 1 to 6 carbon atoms or a carbonyl group. a and b are each independently an integer of 0 to 4. The type of the oxaphosphorin ring-containing structure of each repeating unit in the cyclic phosphazene is independent.

An embodiment of the cyclic phosphazene compound of the present invention is one in which n in Formula (1) is 3 or 4.

Another embodiment of the cyclic phosphazene compound of the present invention is one in which n is 3 and a and b are 0 in Formula (1). An example of the cyclic phosphazene compound of the present invention according to this embodiment is a mixture of diastereomers. In another example of the cyclic phosphazene compound of the present invention according to this embodiment, the steric arrangement of oxaphosphorin ring-containing structures adjacent to each other is a cis-cis-cis form. In still another example of the cyclic phosphazene compound of the present invention according to this embodiment, the steric arrangement of oxaphosphorin ring-containing structures adjacent to each other is a trans-cis-trans form.

The present invention according to another aspect relates to a mixture of cyclic phosphazene compounds having an oxaphosphorin ring-containing structure, and the mixture contains two or more types of cyclic phosphazene compounds having an oxaphosphorin ring-containing structure according to the present invention.

The novel cyclic phosphazene compound having an oxaphosphorin ring-containing structure according to the present invention and the mixture thereof are useful as a flame retardant for a resin material.

The present invention according to still another aspect relates to a method for producing a cyclic phosphazene compound having an oxaphosphorin ring-containing structure according to the present invention. This production method includes step 1 of converting a chlorodibenzoxaphosphorin compound represented by the following Formula (2) into an azidated intermediate using an azidating agent, and step 2 of subjecting the azidated intermediate obtained in the previous step to a cyclization reaction.

[Chemical Formula 2]

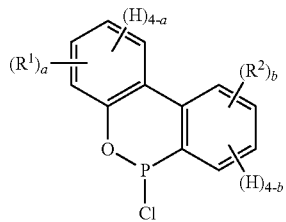

(2)

In Formula (2), $R^1$ and $R^2$ are (i) each independently any one of the groups of a nitro group, an alkyl group or an alkoxy group having 1 to 8 carbon atoms in which at least one group selected from the group consisting of alkyl groups having 1 to 6 carbon atoms and aryl groups may be substituted, and an aryl group or an aryloxy group having 6 to 20 carbon atoms in which at least one group selected from the group consisting of alkyl groups having 1 to 6 carbon atoms and aryl groups may be substituted; or (ii) forming, in-between them, a saturated or an unsaturated cyclic structure that may be substituted with an alkyl group having 1 to 6 carbon atoms or a carbonyl group. Further, a and b are each independently an integer of 0 to 4.

In an embodiment of this production method, the azidated intermediate used in step 2 is a mixture of two or more types of the azidated intermediates. In this embodiment, the mixture of the azidated intermediates is obtained by using two or more types of the chlorodibenzoxaphosphorin compounds in step 1.

According to the production method according to the present invention, a novel cyclic phosphazene compound having an oxaphosphorin ring-containing structure according to the present invention can be produced.

The present invention according to still another aspect relates to a resin composition, and the resin composition contains a resin component and one or two or more types of the cyclic phosphazene compounds having an oxaphosphorin ring-containing structure according to the present invention.

In the resin composition according to the present invention, the resin component is, for example, at least one selected from the group consisting of an epoxy resin, a phenol resin, an unsaturated polyester resin, a diallyl phthalate resin, a maleimide resin, a polyimide resin, a benzoxazine resin, a benzocyclobutene resin, a polyolefin resin, a styrene-based resin, a polyester resin, an aliphatic polyamide resin, a semi-aromatic polyamide resin, a polycarbonate resin, a polyphenylene ether-based resin, a polyarylate resin, and modifications of these resins.

Since the resin composition according to the present invention contains one or two or more types of the novel cyclic phosphazene compounds according to the present invention, it is possible to enhance flame retardancy and achieve Low Dk/Df while deterioration in physical properties of the resin material is suppressed.

The present invention according to still another aspect relates to a resin molded body, and the resin molded body is made of the resin composition of the present invention.

Since the resin molded body according to the present invention is made of the resin composition of the present invention, it is possible to enhance flame retardancy and achieve Low Dk/Df while deterioration in physical properties of the resin material is suppressed.

The present invention according to still another aspect relates to an electric or electronic component, and the electric or electronic component includes the resin molded body of the present invention.

Since the electric or electronic component according to the present invention includes the resin molded body of the present invention, it is possible to enhance flame retardancy and achieve Low Dk/Df while deterioration in physical properties of the resin material is suppressed.

EMBODIMENTS OF THE INVENTION

<Cyclic Phosphazene Compound Having Oxaphosphorin Ring-Containing Structure>

The cyclic phosphazene compound of the present invention has an oxaphosphorin ring-containing structure, and is represented by the following Formula (1).

[Chemical Formula 3]

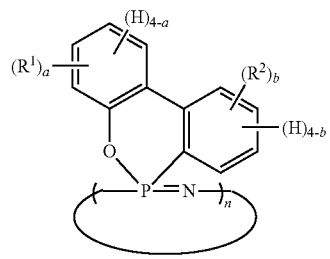

(1)

In Formula (1), n represents an integer of 3 to 8. Therefore, the cyclic phosphazene compound having an oxaphosphorin ring-containing structure, which is represented by Formula (1), is a cyclic phosphazene compound (trimer) having an oxaphosphorin ring-containing structure in which n is 3, a cyclic phosphazene compound (tetramer) having an oxaphosphorin ring-containing structure in which n is 4, a cyclic phosphazene compound (pentamer) having an oxaphosphorin ring-containing structure in which n is 5, a cyclic phosphazene compound (hexamer) having an oxaphosphorin ring-containing structure in which n is 6, a cyclic phosphazene compound (heptamer) having an oxaphosphorin ring-containing structure in which n is 7, or a cyclic phosphazene compound (octamer) having an oxaphosphorin ring-containing structure in which n is 8.

When the cyclic phosphazene compound of the present invention is used, for example, as a component of a resin composition for producing a resin molded body for an electric or electronic component, a resin molded body with excellent dielectric properties is more likely to be achieved if n in Formula (1) is smaller. Therefore, when the cyclic phosphazene compound of the present invention is used as a material for producing a resin molded body for an electric or electronic component, the cyclic phosphazene compound is preferably one in which n in Formula (1) is an integer of 3 to 4, and particularly preferably one in which n is 3. In addition, when the cyclic phosphazene compound of the present invention is a mixture of two or more types of compounds having different n, a mixture having a larger content of a cyclic phosphazene compound having smaller n is more likely to achieve a resin molded body having excellent dielectric properties. Therefore, when the cyclic phosphazene compound of the present invention is a mixture of cyclic phosphazene compounds having different n and is used as a material for producing a resin molded body for an electric or electronic component, the mixture containing 95 mass % or more of a cyclic phosphazene compound in which n is 3 to 4 is preferable, and the mixture containing 95 mass % or more of a cyclic phosphazene compound in which n is 3 is particularly preferable.

$R^1$ and $R^2$ in Formula (1) are each independent and each represents a nitro group, the following R-1 or R-2, or R-3. In Formula (1), a and b indicating the numbers of substituents $R^1$ and $R^2$ are each independent and an integer of 0 to 4.

R-1:

An alkyl group or an alkoxy group having 1 to 8 carbon atoms in which at least one group selected from the groups of alkyl groups having 1 to 6 carbon atoms and aryl groups may be substituted.

Examples of the alkyl group include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, a 2-ethylhexyl group, a benzyl group, and a 2-phenylethyl group. Examples of the alkoxy group include a methoxy group, an ethoxy group, an n-propoxy group, an isopropoxy group, an n-butoxy group, an isobutoxy group, a sec-butoxy group, a tert-butoxy group, an n-pentoxy group, an n-hexyloxy group, an n-heptyloxy group, an n-octyloxy group, an n-nonyloxy group, a 2-ethylhexyloxy group, a benzyloxy group, and a 2-phenylethyloxy group.

When the cyclic phosphazene compound of the present invention is used as a material for producing a resin molded body for an electric or electronic component, R-1 is preferably a methyl group, an ethyl group, an n-propyl group, a benzyl group or a methoxy group, and is particularly preferably a methyl group or an ethyl group.

R-2:

An aryl group or an aryloxy group having 6 to 20 carbon atoms in which at least one group selected from the group consisting of alkyl groups having 1 to 6 carbon atoms and aryl groups may be substituted.

Examples of the aryl group include a phenyl group, a methylphenyl group, a dimethylphenyl group, an ethylphenyl group, an ethylmethylphenyl group, a diethylphenyl group, an n-propylphenyl group, an isopropylphenyl group, an isopropylmethylphenyl group, an isopropylethylphenyl group, a diisopropylphenyl group, an n-butylphenyl group, a sec-butylphenyl group, a tert-butylphenyl group, an n-pentylphenyl group, an n-hexylphenyl group, a phenylphenyl group, a naphthyl group, an anthryl group, and a phenanthryl group. Examples of the aryloxy group include a phenyloxy group, a methylphenyloxy group, a dimethylphenyloxy group, an ethylphenyloxy group, an ethylmethylphenyloxy group, a diethylphenyloxy group, an n-propylphenyloxy group, an isopropylphenyloxy group, an isopropylmethylphenyloxy group, an isopropylethylphenyloxy group, a diisopropylphenyloxy group, an n-butylphenyloxy group, a sec-butylphenyloxy group, a tert-butylphenyloxy group, an n-pentylphenyloxy group, an n-hexylphenyloxy group, a phenylphenyloxy group, a naphthyloxy group, an anthryloxy group, and a phenanthryloxy group.

When the cyclic phosphazene compound of the present invention is used as a material for producing a resin molded body for an electric or electronic component, R-2 is preferably a phenyl group, a methylphenyl group, a dimethylphenyl group, a diethylphenyl group, a phenylphenyl group, a naphthyl group or a phenyloxy group, and is particularly preferably a phenyl group or a methylphenyl group.

R-3:

A saturated or an unsaturated cyclic structure formed between $R^1$ and $R^2$, and this cyclic structure is optionally substituted with an alkyl group or a carbonyl group having 1 to 6 carbon atoms.

Examples of the repeating unit of Formula (1) having an oxaphosphorin ring-containing structure having the above-mentioned saturated cyclic structure include those represented by the following Formulae (3) and (4).

[Chemical Formula 4]

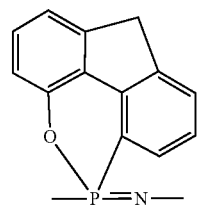

(3)

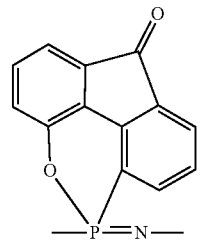

(4)

Examples of the repeating unit of Formula (1) having an oxaphosphorin ring-containing structure having the above-mentioned unsaturated cyclic structure include that represented by the following Formula (5).

[Chemical Formula 5]

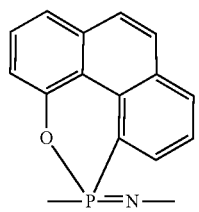

(5)

In the cyclic phosphazene compound of the present invention, the types of oxaphosphorin ring-containing structures of the respective repeating units are independent. Therefore, the cyclic phosphazene compound of the present invention may have the same oxaphosphorin ring-containing structure throughout thereof or may have two or more types of oxaphosphorin ring-containing structures.

Specific examples of the cyclic phosphazene compound represented by Formula (1) of the present invention include any one of those including a cyclotriphosphazene compound having an oxaphosphorin ring-containing structure in which n in Formula (1) is 3, a cyclotetraphosphazene compound having an oxaphosphorin ring-containing structure in which n in Formula (1) is 4, a cyclopentaphosphazene compound having an oxaphosphorin ring-containing structure in which n in Formula (1) is 5, a cyclohexaphosphazene compound having an oxaphosphorin ring-containing structure in which n in Formula (1) is 6, a cycloheptaphosphazene compound having an oxaphosphorin ring-containing structure in which n in Formula (1) is 7, and a cyclooctaphosphazene compound having an oxaphosphorin ring-containing structure in which n in Formula (1) is 8, and the combinations of a, b, $R^1$, and $R^2$ in Formula (1) are as indicated in the following Table 1.

TABLE 1

| Combination example | a | b | $R^1$ | $R^2$ |
|---|---|---|---|---|
| 1 | 0 | 0 | — | — |
| 2 | 1 | 0 | Methyl group | — |
| 3 | 0 | 1 | — | Methyl group |
| 4 | 2 | 0 | Methyl group | — |
| 5 | 0 | 2 | — | Methyl group |
| 6 | 1 | 1 | Methyl group | Methyl group |
| 7 | 1 | 0 | Ethyl group | — |
| 8 | 0 | 1 | — | Ethyl group |
| 9 | 1 | 0 | tert-Butyl group | — |
| 10 | 2 | 0 | Methyl group and tert-butyl group | — |
| 11 | 1 | 0 | Benzyl group | — |
| 12 | 0 | 1 | — | Methoxy group |
| 13 | 0 | 2 | — | Methyl group and methoxy group |
| 14 | 1 | 0 | Phenyl group | — |
| 15 | 1 | 0 | Nitro group | — |
| 16 | 0 | 0 | A saturated cyclic structure represented by Formula (3) is formed between $R^1$ and $R^2$ | |
| 17 | 0 | 0 | A saturated cyclic structure represented by Formula (4) is formed between $R^1$ and $R^2$ | |
| 18 | 0 | 0 | An unsaturated cyclic structure represented by Formula (5) is formed between $R^1$ and $R^2$ | |

When the cyclic phosphazene compound of the present invention is used as a material for producing a resin molded body for an electric or electronic component, among the above examples, a cyclotriphosphazene compound in which n in Formula (1) is 3 or a cyclotetraphosphazene compound in which n in Formula (1) is 4, both compounds being compounds in which a, b, $R^1$ and $R^2$ are those of Combination Example 1, 2, or 3, is preferred, and a cyclotriphosphazene compound in which n in Formula (1) is 3, and a, b, $R^1$ and $R^2$ are those of Combination Example 1 or 2 is particularly preferred.

Among the above examples, a cyclotriphosphazene compound in which n in Formula (1) is 3, and a, b, $R^1$ and $R^2$ are those of Combination Example 1 is a structure represented by the following Formula (6).

[Chemical Formula 6]

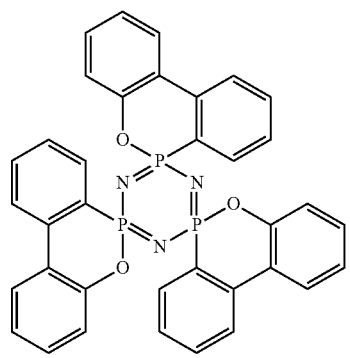

(6)

The cyclic phosphazene compound having an oxaphosphorin ring-containing structure, which is represented by Formula (6), is usually obtained as a mixture of diastereomers when produced by a production method described later. That is, the oxaphosphorin ring-containing structure represented by Formula (6) is obtained as a mixture of a compound represented by the following Formula (7) in which the steric arrangement of the oxaphosphorin ring-containing structures adjacent to each other is a cis-cis-cis form (hereinafter, referred to as "cis-form") and a compound represented by the following Formula (8) in which the steric arrangement of the oxaphosphorin ring-containing structures adjacent to each other is a trans-cis-trans form (hereinafter, referred to as a "trans-form").

[Chemical Formula 7]

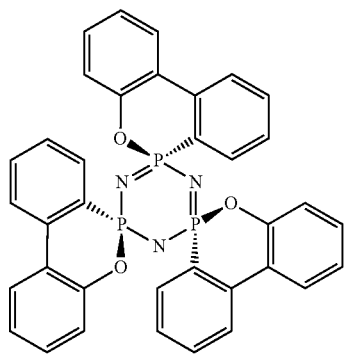

(7)

[Chemical Formula 8]

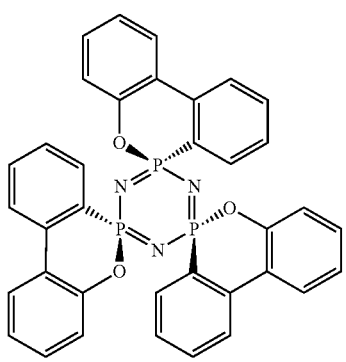

(8)

Such a mixture of diastereomers can be used as it is as a mixture, but a cis-form compound and a trans-form compound can be isolated and used as a single product of each form. As the isolation method, for example, a method including a combination of separation using solubility in a solvent such as toluene and filtration, solvent extraction, separation by recrystallization or column chromatography, or the like can be adopted.

<Mixture of Cyclic Phosphazene Compounds Having Oxaphosphorin Ring-Containing Structure>

The mixture of cyclic phosphazene compounds of the present invention contains two or more types of cyclic phosphazene compounds having an oxaphosphorin ring-containing structure according to the present invention. Examples of this mixture include any mixture of those described as specific examples of the cyclic phosphazene compound having an oxaphosphorin ring-containing structure according to the present invention. When the cyclic phosphazene compound of the present invention is used as a material for producing a resin molded body for an electric or electronic component, the mixture is preferably a mixture of a cyclotriphosphazene compound in which n in Formula (1) is 3 and a cyclotetraphosphazene compound in which n in Formula (2) is 4, both compounds being compounds in which a, b, $R^1$ and $R^2$ are those of any combination selected from the groups of Combination Examples 1, 2 and 3.

The mixture of cyclic phosphazene compounds according to the present invention may be a mixture of isomers, such as a mixture of diastereomers of the above-described cyclotriphosphazene compound. The cyclic phosphazene compound according to the present invention in which n in Formula (1) is 4 or more is usually obtained as a mixture of stereoisomers including many diastereomers and enantiomers when produced by a production method described later.

<Method for Producing Cyclic Phosphazene Compound Having Oxaphosphorin Ring-Containing Structure>

The cyclic phosphazene compound having an oxaphosphorin ring-containing structure according to the present invention can be produced, for example, by any one of the following Production Methods 1 to 4 in which a chlorodibenzoxaphosphorin-based compound is used as a starting material, and an intermediate derived from the starting material is cyclized between molecules.

Production Method 1

In this production method, for example, the cyclic phosphazene compound is produced according to the method for producing a cyclic phosphazene compound as described in Non-Patent Document 1 or 2 below, that is, a production method including a step 1 of azidating a chlorodibenzoxaphosphorin-based compound and a step 2 of cyclizing the azidated intermediate obtained in the step 1.

[Non-Patent Document 1]

G. Tesi, C. P. Haber, C. M. Douglas, Proc. Chem. Soc., London, 1960, p. 219.

[Non-Patent Document 2]

R. H. Kratzer, K. L. Paciorek, Inorg. Chem., 1965, Vol. 4, p. 1767.

Chlorodibenzoxaphosphorin-Based Compound:

In this production method, first, a chlorodibenzoxaphosphorin-based compound represented by the following Formula (2), which is used as a raw material, is prepared.

[Chemical Formula 9]

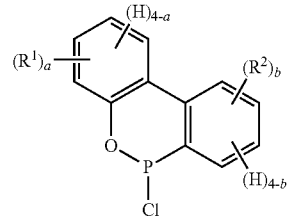

(2)

$R^1$ and $R^2$ in Formula (2) are each independent, and each represent a nitro group, or the following R-1, R-2 or R-3. In Formula (2), a and b indicating the numbers of substituents $R^1$ and $R^2$ are each independent and an integer of 0 to 4.

R-1:

R-1 is the same as R-1 in Formula (1).

R-2:

R-2 is the same as R-2 in Formula (1).

R-3:

R-3 is a saturated or an unsaturated cyclic structure formed between $R^1$ and $R^2$, and this cyclic structure may be substituted with an alkyl group having 1 to 6 carbon atoms or a carbonyl group.

Examples of the chlorodibenzoxaphosphorin-based compound represented by Formula (2) having an oxaphosphorin ring-containing structure including the above-mentioned saturated cyclic structure include compounds represented by the following Formulae (9) and (10).

[Chemical Formula 10]

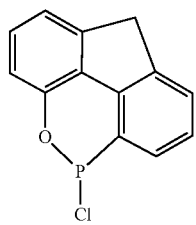

(9)

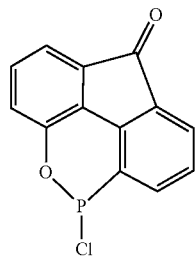

(10)

Examples of the chlorodibenzoxaphosphorin-based compound represented by Formula (2) having an oxaphosphorin ring-containing structure including the above-mentioned unsaturated cyclic structure include a compound represented by the following Formula (11).

[Chemical Formula 11]

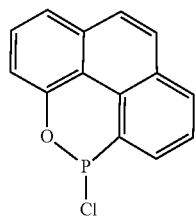

(11)

When the compounds given as the specific examples described above are produced as the cyclic phosphazene compound having an oxaphosphorin ring-containing structure according to the present invention, a compound in which a, b, $R^1$, and $R^2$ in Formula (2) correspond to any of the combinations in Table 1 above is selected as a chlorodibenzoxaphosphorin-based compound as a raw material.

The chlorodibenzoxaphosphorin-based compound represented by Formula (2) can be produced by reacting a phenolic compound represented by the following Formula (12) with phosphorus trichloride, and then adding a catalyst such as zinc chloride to the reaction product to perform a cyclization reaction.

[Chemical Formula 12]

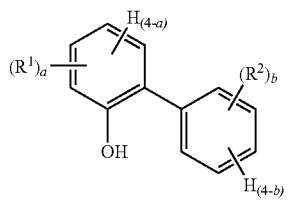

(12)

$R^1$ and $R^2$ and a and b in Formula (12) are the same as those in Formula (2).

The method for producing such a chlorodibenzoxaphosphorin-based compound is described in documents including the following Patent Documents 8 and 9, and Non-Patent Documents 3 and 4.

[Patent Document 8]
US Patent Publication No. 3702878
[Patent Document 9]
US Patent Publication No. 5391798
[Non-Patent Document 3]
Stephen D. Pastor, John D. Spivack, Leander P. Steinhuebel, Phosphorus and Sulfur, 1987, Vol. 31, p. 71.
[Non-Patent Document 4]
Asfia Qureshi, Allan S. Hay, J. Chem. Res (M), 1998, p. 1601.

As the phenolic compound represented by Formula (12), a phenolic compound having $R^1$ and $R^2$, and a and b corresponding to $R^1$ and $R^2$, and a and b of a target cyclic phosphazene compound having an oxaphosphorin ring-containing structure is used. Examples of the phenolic compound include 2-phenylphenol, 2-methyl-6-phenylphenol, 3-methyl-6-phenylphenol, 3-methyl-2-phenylphenol, 4-methyl-2-phenylphenol, 2-(2-methylphenyl) phenol, 2-(3-methylphenyl) phenol, 2-(4-methylphenyl) phenol, 2,3-dimethyl-6-phenylphenol, 2,5-dimethyl-6-phenylphenol, 3,5-dimethyl-2-phenylphenol, 4,5-dimethyl-2-phenylphenol, 2-(2,3-dimethylphenyl) phenol, 2-(2,4-dimethylphenyl) phenol, 2-(2,5-dimethylphenyl) phenol, 2-(3,5-dimethylphenyl) phenol, 2'-hydroxy-2,3'-dimethyl-biphenyl, 2'-hydroxy-2, 5 '-dimethyl-biphenyl, 2'-hydroxy-3,5'-dimethyl-biphenyl, 2'-hydroxy-4,5'-dimethyl-biphenyl, 2'-hydroxy-3,3'-dimethyl-biphenyl, 2-ethyl-6-phenylphenol, 4-ethyl-2-phenylphenol, 2-(2-ethylphenyl) phenol, 2-(4-ethylphenyl) phenol, 2-tert-butyl-6-phenylphenol, 4-tert-butyl-2-phenylphenol, 2-tert-butyl-4-methyl-6-phenylphenol, 5-benzyl-2-phenylphenol, 2-(2-methoxyphenyl) phenol, 2-(3-methoxyphenyl) phenol, 2-(4-methoxyphenyl) phenol, 2-(2-methoxy-5-methylphenyl) phenol, 2-(4-methoxy-2-methylphenyl) phenol, 2-(4-methoxy-3-methylphenyl) phenol, 2-(4-ethoxy-2-methylphenyl) phenol, 2,3-diphenylphenol, 2,6-diphenylphenol, 4-nitro-2-phenylphenol, 4-hydroxyfluorene, 4-hydroxyfluorenone, and 4-phenanthrol.

When a target cyclic phosphazene compound having an oxaphosphorin ring-containing structure has one type of oxaphosphorin ring-containing structure, one type of phenolic compound corresponding to a target oxaphosphorin ring-containing structure may be used as the above-mentioned phenolic compound. When a target cyclic phosphazene compound having an oxaphosphorin ring-containing structure has two or more types of oxaphosphorin ring-containing structures, two or more types of phenolic compounds corresponding to target oxaphosphorin ring-containing structures can be mixed and used as the above-described phenolic compound.

In addition to the above-described methods using a phenolic compound, the chlorodibenzoxaphosphorin-based compound represented by Formula (2) can also be produced by chlorinating dibenzoxaphosphorin oxide with phosphorus trichloride, as described in Non-Patent Document 5.

[Non-Patent Document 5]
P. Abranyi-Balogha, G. Keglevich, Synthetic Communications, 2011, vol. 41, p. 1421.

Step 1:

As the chlorodibenzoxaphosphorin-based compound represented by Formula (2) to be subjected to azidation in this step, one type of chlorodibenzoxaphosphorin-based compound or a mixture of two or more types of chlorodibenzoxaphosphorin-based compounds is used depending on the type of oxaphosphorin ring-containing structure of a target cyclic phosphazene compound. The mixture of two or more types of compounds may be a mixture prepared by mixing two or more types of the chlorodibenzoxaphosphorin-based compounds represented by Formula (2) prepared individually, or may be a mixture obtained by mixing and using two or more types of phenolic compounds in the preparation of the chlorodibenzoxaphosphorin-based compound represented by Formula (2).

In the azidation of the chlorodibenzoxaphosphorin-based compound, various known azidating agents can be used. Examples of usable azidating agents include metal azides such as lithium azide, sodium azide and potassium azide; organic azide compounds such as trimethylsilyl azide, p-toluenesulfonyl azide, and tosyl azide (TsN3); and phosphoryl azide compounds such as diphenylphosphoryl azide (DPPA). Among such azidating agents, sodium azide, trimethylsilyl azide, or DPPA is preferably used from the viewpoint of versatility, and sodium azide is particularly preferably used. Two or more types of azidating agents may be used in combination by mixing or the like.

In order to allow the azidation reaction to proceed fully, the amount of the azidating agent used is preferably set to about 1 to 2 equivalents, and more preferably set to about 1.1 to 1.3 equivalents with respect to the amount of the chlorodibenzoxaphosphorin-based compound represented by Formula (2).

In this step, the chlorodibenzoxaphosphorin-based compound represented by Formula (2) and an azidating agent are usually added to a solvent, to allow an azidation reaction to proceed. At this time, the reaction system may be heated to about 40 to 250° C. The type of the solvent used here is not particularly limited, but an aprotic polar solvent is preferable. Examples of the aprotic polar solvent include organic solvents such as acetone, acetonitrile, N, N-dimethylformamide, and dimethyl sulfoxide. Among such aprotic polar solvents, N, N-dimethylformamide or dimethyl sulfoxide, which has a particularly high relative dielectric constant and is available at low cost, is preferably used. Two or more types of solvents may be used in combination by mixing or the like.

By the azidation reaction in this step, the chlorodibenzoxaphosphorin-based compound represented by Formula (2) is converted into an azidated intermediate.

When the mixture of the chlorodibenzoxaphosphorin-based compounds represented by Formula (2) is used in this step, a mixture of azidated intermediates corresponding to the mixture of the chlorodibenzoxaphosphorin-based compounds represented by Formula (2) is obtained in this step.

Step 2:

The azidated intermediate obtained in step 1 is subjected to a cyclization reaction to be converted into a target cyclic phosphazene compound having an oxaphosphorin ring. As the azidated intermediate to be subjected to the cyclization reaction in this step, one type of azidated intermediate or a mixture of two or more types of azidated intermediates is used depending on the type of oxaphosphorin ring-containing structure of a target cyclic phosphazene compound. The mixture of two or more types of intermediates may be a mixture prepared by mixing two or more types of azidated intermediates individually prepared in step 1, or a mixture obtained by using a mixture of two or more types of the chlorodibenzoxaphosphorin-based compounds represented by Formula (2) in step 1.

In this step, the cyclization reaction can be allowed to proceed basically by stirring or leaving the reaction solution obtained in step 1. At this time, the reaction system may be heated. The heating temperature of the reaction system is usually preferably set to 40 to 100° C. The progress of the cyclization reaction, that is, the degree of multimerization, such as trimerization and tetramerization of the azidated intermediate, can be controlled within a certain range by selecting the type of usable solvent in this step and adjusting the reaction temperature.

The cyclization reaction may be allowed to proceed in the absence of a solvent or in a solvent. The type of usable solvent is not particularly limited as long as it does not adversely affect the cyclization reaction, but an aprotic polar solvent is usually preferable. Examples of the preferred aprotic polar solvent include organic solvents such as acetone, acetonitrile, N, N-dimethylformamide, and dimethyl sulfoxide, and N, N-dimethylformamide or dimethyl sulfoxide, which has a particularly high relative dielectric constant and is available at low cost, is preferred. Two or more types of solvents may be used in combination by mixing or the like. When a solvent is used, the heating temperature for the cyclization reaction is controlled within a range not exceeding the boiling point of the solvent.

The target cyclic phosphazene compound having an oxaphosphorin ring-containing structure obtained in this step is usually obtained as a mixture of a plurality of types of compounds having different numbers of repeating units of Formula (1). When one type of azidated intermediate is used in this step, the oxaphosphorin ring-containing structure of each repeating unit of Formula (1) is the same in the target cyclic phosphazene compound. When two or more types of azidated intermediates are used in this step, the oxaphosphorin ring-containing structure of each repeating unit of Formula (1) is two or more types in the target cyclic phosphazene compound.

The target cyclic phosphazene compound having an oxaphosphorin ring-containing structure obtained in this step can be usually isolated and purified from the reaction system by an ordinary method such as filtration, solvent extraction, separation by column chromatography, or recrystallization.

Production Method 2

In this production method, a target cyclic phosphazene compound having an oxaphosphorin ring-containing structure is produced according to a process including step 1 of chlorinating a chlorodibenzoxaphosphorin-based compound to be converted into a trichloro-dibenzoxyphosphorane-based compound and step 2 of cyclizing the trichloro-dibenzoxyphosphorane-based compound obtained in step 1.

Step 1:

The chlorodibenzoxaphosphorin-based compound used in this step is the chlorodibenzoxaphosphorin-based compound represented by Formula (2) used in Production Method 1. One type of chlorodibenzoxaphosphorin-based compound or a mixture of two or more types of chlorodibenzoxaphosphorin-based compounds is used depending on the type of oxaphosphorin ring-containing structure of the target cyclic phosphazene compound. The mixture of two or more types of compounds may be a mixture prepared by mixing two or more types of chlorodibenzoxaphosphorin-based compounds prepared individually, or may be a mixture obtained by mixing and using two or more types of phenolic compounds in the preparation of the chlorodibenzoxaphosphorin-based compound.

In this step, for example, in accordance with the description of Non-Patent Document 6 below, a chlorodibenzoxaphosphorin-based compound is chlorinated through a reaction with a chlorinating agent to be converted into a trichloro-dibenzoxyphosphorane-based compound.

[Non-Patent Document 6]

J. Gloede, U. Piepera, B. Costisella, R-P. Kruger, Z. Anorg. Allg. Chem. 2003, Vol. 629, p. 998.

In the chlorination in this step, various known chlorinating agents can be used. An example of a preferred chlorinating agent is chlorine gas. The amount of the chlorinating agent used is preferably set to 1 to 1.1 equivalents and more preferably set to 1.01 to 1.05 equivalents with respect to the amount of the chlorodibenzoxaphosphorin-based compound, from the viewpoint of suppressing excessive progress of chlorination while allowing the chlorination reaction to sufficiently proceed.

In this step, the chlorinating agent is usually added to the chlorodibenzoxaphosphorin-based compound in the absence of a solvent or in a solvent to allow the chlorination reaction to proceed. At this time, the reaction system may be heated to about 40 to 150° C. When a solvent is used, the type of usable solvent is not particularly limited, but an aprotic solvent is preferable. Examples of the aprotic solvent may include organic solvents such as chlorobenzene, dichlorobenzene, toluene, xylene, and mesitylene. Among such aprotic solvents, chlorobenzene or dichlorobenzene is preferably used because the solvent itself is hardly chlorinated. Two or more types of solvents may be used in combination by mixing or the like.

The trichloro-dibenzoxyphosphorane-based compound derived from the chlorodibenzoxaphosphorin-based compound by chlorination in this step is represented by the following Formula (13). $R^1$ and $R^2$ and a and b in Formula (13) are the same as those in Formula (2).

[Chemical Formula 13]

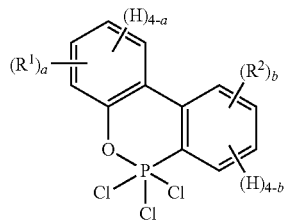

(13)

When the mixture of chlorodibenzoxaphosphorin-based compounds is used in this step, a mixture of trichloro-dibenzoxyphosphorane-based compounds represented by Formula (13) corresponding to the mixture of chlorodibenzoxaphosphorin-based compounds is obtained in this step.

Step 2:

In this step, the trichloro-dibenzoxyphosphorane-based compound obtained in step 1 is subjected to a cyclization reaction to be converted into a target cyclic phosphazene compound having an oxaphosphorin ring. As the trichloro-dibenzoxyphosphorane-based compound used in this step, one type of trichloro-dibenzoxyphosphorane-based compound or a mixture of two or more types of trichloro-dibenzoxyphosphorane-based compounds is used depending on the type of oxaphosphorin ring-containing structure of the target cyclic phosphazene compound. The mixture of two or more types of compounds may be a mixture prepared by mixing two or more types of trichloro-dibenzoxyphosphorane-based compounds individually prepared in step 1, or may be a mixture obtained by using a mixture of two or more types of chlorodibenzoxaphosphorin-based compounds in step 1.

The trichloro-dibenzoxyphosphorane-based compound obtained in step 1 is reacted with ammonia or ammonium chloride to be cyclized, for example, in accordance with the description of Patent Document 10, or Non-Patent Document 7 or 8 below.

[Patent Document 10]

US Patent Publication No. 2853517

[Non-Patent Document 7]

C. P. Haber, D. L. Herring, E. A. Lawton, J. Am. Chem. Sci., 1958, Vol. 80, p. 2116.

[Non-Patent Document 8]

M. Taillefer, F. Plenat, C. Chamalet-Combes, V. Vicente, H. J. Cristau, Phosphorus Res. Bull., 1999, Vol. 10, p. 696.

The cyclization reaction of the trichloro-dibenzoxyphosphorane-based compound by ammonia or ammonium chloride may proceed in the absence of a solvent or in a solvent. When a solvent is used, the type of usable solvent is not particularly limited as long as it does not adversely affect the cyclization reaction, but an aprotic solvent is usually preferable. Examples of preferred aprotic solvents may include organic solvents such as chlorobenzene, dichlorobenzene, toluene, xylene and mesitylene, and chlorobenzene or toluene, which is available at low cost, is preferable. Two or more types of solvents may be used in combination by mixing or the like.

In the cyclization reaction, the reaction system may be heated. The heating temperature of the reaction system is usually preferably set to 40 to 170° C., but when a solvent is used, the heating temperature is controlled within a range not exceeding the boiling point of the solvent.

The progress of the cyclization reaction, that is, the degree of multimerization such as trimerization and tetramerization of the trichloro-dibenzoxyphosphorane-based compound can be controlled within a certain range by selecting the type of solvent used in this step and adjusting the reaction temperature.

The target cyclic phosphazene compound having an oxaphosphorin ring-containing structure obtained in this step is usually obtained as a mixture of a plurality of types of compounds having different numbers of repeating units of Formula (1). In addition, when one type of trichloro-dibenzoxyphosphorane-based compound is used in this step, the oxaphosphorin ring-containing structure of each repeating unit of Formula (1) is the same in the target cyclic phosphazene compound. When two or more types of trichloro-dibenzoxyphosphorane-based compounds are used in this step, the oxaphosphorin ring-containing structure of each repeating unit of Formula (1) is two or more types in the target cyclic phosphazene compound.

Production Method 3

In this production method, in accordance with the description of Non-Patent Document 9 below, a chlorodibenzoxaphosphorin-based compound is reacted with chloroamine, and an intermediate product thereof is cyclized to produce a target cyclic phosphazene compound having an oxaphosphorin ring-containing structure.

[Non-Patent Document 9]

I. T. Gilson, H. H. Sisler, Inorg. Chem., 1965, Vol. 4, p. 273.

The chlorodibenzoxaphosphorin-based compound used in this production method is the chlorodibenzoxaphosphorin-based compound represented by Formula (2) used in Production Method 1. One type of chlorodibenzoxaphosphorin-based compound or a mixture of two or more types of chlorodibenzoxaphosphorin-based compounds is used depending on the type of oxaphosphorin ring-containing structure of the target cyclic phosphazene compound. The mixture of two or more types of compounds may be a mixture prepared by mixing two or more types of chlorodibenzoxaphosphorin-based compounds prepared individually, or may be a mixture obtained by mixing and using two or more types of phenolic compounds in the preparation of the chlorodibenzoxaphosphorin-based compound.

The amount of chloroamine used is preferably set to about 1 to 1.1 equivalents, and more preferably about 1.01 to 1.05 equivalents with respect to the amount of the chlorodibenzoxaphosphorin-based compound, from the viewpoint of suppressing excessive progress of the chloroamination reaction while allowing the chloroamination reaction of the chlorodibenzoxaphosphorin-based compound to sufficiently proceed.

The reaction between the chlorodibenzoxaphosphorin-based compound and chloroamine may proceed in the absence of a solvent or in a solvent. When a solvent is used, the type of usable solvent is not particularly limited as long as it does not adversely affect the cyclization reaction, but an aprotic solvent is preferable. Examples of preferred aprotic solvents may include organic solvents such as chlorobenzene, dichlorobenzene, toluene, xylene and mesitylene, and chlorobenzene or toluene, which is available at low cost, is preferable. Two or more types of solvents may be used in combination by mixing or the like.

In the reaction between the chlorodibenzoxaphosphorin-based compound and chloroamine, the reaction system may be heated. The heating temperature of the reaction system is usually preferably set to 40 to 170° C., but when a solvent is used, the heating temperature is controlled within a range not exceeding the boiling point of the solvent.

In the reaction between the chlorodibenzoxaphosphorin-based compound and chloroamine, chloroamine adds to the chlorodibenzoxaphosphorin-based compound. Then, the resulting addition product (that is, the intermediate product) is condensed through dehydrochlorination to proceed a cyclization reaction, whereby a target cyclic phosphazene compound having an oxaphosphorin ring-containing structure is obtained.

The progress of the cyclization reaction, that is, the degree of multimerization such as trimerization and tetramerization of the chlorodibenzoxaphosphorin-based compound can be controlled within a certain range by selecting the type of solvent to be used and adjusting the reaction temperature.

The target cyclic phosphazene compound having an oxaphosphorin ring-containing structure obtained in this production method is usually obtained as a mixture of a plurality of types of compounds having different numbers of repeating units of Formula (1). In addition, when one type of chlorodibenzoxaphosphorin-based compound is used, the oxaphosphorin ring-containing structure of each repeating unit of Formula (1) is the same in the target cyclic phosphazene compound. When two or more types of chlorodibenzoxaphosphorin-based compounds are used, the oxaphosphorin ring-containing structure of each repeating unit of Formula (1) is two or more types in the target cyclic phosphazene compound.

Production Method 4

In this production method, a target cyclic phosphazene compound having an oxaphosphorin ring-containing structure is produced according to a process including step 1 of preparing a phosphonamidate-based compound represented by the following Formula (14) from a chlorodibenzoxaphosphorin-based compound and step 2 of converting the phosphonamidate-based compound obtained in step 1 into a cyclic phosphazene compound.

[Chemical Formula 14]

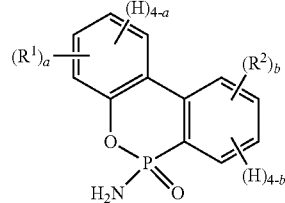

(14)

$R^1$ and $R^2$ and a and b in Formula (14) are the same as those in Formula (2).

Step 1:

This step includes step 1A of converting a chlorodibenzoxaphosphorin-based compound into a dibenzoxaphosphane-oxide-based compound represented by the following Formula (15), step 1B of converting the dibenzoxaphosphane-oxide-based compound obtained in step 1A into a chloro-dibenzoxaphosphane-oxide-based compound represented by the following Formula (16), and step 1C of converting the chloro-dibenzoxaphosphane-oxide-based compound obtained in step 1B into a target phosphonamidate-based compound.

Step 1A

A chlorodibenzoxaphosphorin-based compound used in this step is the chlorodibenzoxaphosphorin-based compound represented by Formula (2) used in Production Method 1. One type of chlorodibenzoxaphosphorin-based compound or a mixture of two or more types of chlorodibenzoxaphosphorin-based compounds is used depending on the type of oxaphosphorin ring-containing structure of the target cyclic phosphazene compound. The mixture of two or more types of compounds may be a mixture prepared by mixing two or more types of chlorodibenzoxaphosphorin-based compounds prepared individually, or may be a mixture obtained by mixing and using two or more types of phenolic compounds in the preparation of the chlorodibenzoxaphosphorin-based compound.

In this step, for example, in accordance with the description of Patent Document 11 or 12 below, a chlorodibenzoxaphosphorin-based compound is hydrolyzed to be converted into a dibenzoxaphosphane-oxide-based compound represented by the following Formula (15).

[Patent Document 11]

US Patent Publication No. 5481017

[Patent Document 12]

US Patent Publication No. 5821376

[Chemical Formula 15]

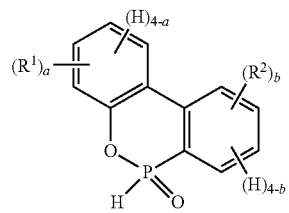

(15)

$R^1$ and $R^2$ and a and b in Formula (15) are the same as those in Formula (2).

In the hydrolysis of the chlorodibenzoxaphosphorin-based compound, various known hydrolyzing agents can be used. Examples of usable hydrolyzing agents include water, ice, and water vapor.

The amount of the hydrolyzing agent used is preferably set to 1 to 100 equivalents and more preferably set to 10 to 50 equivalents with respect to the amount of the chlorodibenzoxaphosphorin-based compound, from the viewpoint of suppressing excessive progress of the hydrolysis while allowing the hydrolysis reaction to sufficiently proceed.

In this step, the hydrolyzing agent is usually added to the chlorodibenzoxaphosphorin-based compound in the absence of a solvent or in a solvent to allow the hydrolysis reaction to proceed. At this time, the reaction system may be heated to about 40 to 150° C. When a solvent is used, the usable solvent is not particularly limited as long as it hardly inhibits the hydrolysis reaction, but an aprotic solvent is preferable. Examples of the aprotic solvent may include organic solvents such as chlorobenzene, dichlorobenzene, toluene, xylene, mesitylene, acetone, tetrahydrofuran, and acetonitrile. Among such aprotic solvents, chlorobenzene or toluene is preferably used because it is easily separated from the hydrolyzing agent. Two or more types of solvents may be used in combination by mixing or the like.

When the mixture of chlorodibenzoxaphosphorin-based compounds is used in this step, a mixture of dibenzoxaphosphane-oxide-based compounds represented by Formula (15) corresponding to the mixture of chlorodibenzoxaphosphorin-based compounds is obtained in this step.

Step 1B

In this step, for example, in accordance with the description of Non-Patent Document 10 below, the dibenzoxaphosphane-oxide-based compound obtained in step 1A is chlorinated to be converted into a chloro-dibenzoxaphosphane-oxide-based compound represented by the following Formula (16).

[Non-Patent Document 10]

A. Salmeia, G. Baumgartner, M. Jovic, A. Gossi, W. Riedl, T. Zich, S. Gann, Org. Process Res. Dev., 2018, Vol. 22, p. 1570-1577.

[Chemical Formula 16]

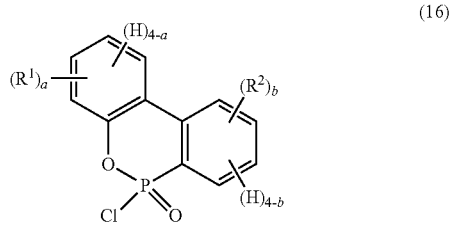

(16)

$R^1$ and $R^2$ and a and b in Formula (16) are the same as those in Formula (2).

In this step, one type of dibenzoxaphosphane-oxide-based compound or a mixture of two or more types of dibenzoxaphosphane-oxide-based compounds obtained in step 1A is used depending on the type of target chloro-dibenzoxaphosphane-oxide-based compound. The mixture of two or more types of compounds may be a mixture prepared by mixing two or more types of dibenzoxaphosphane-oxide-based compounds individually prepared in step 1A, or may be a mixture obtained by using a mixture of two or more types of chlorodibenzoxaphosphorin-based compounds in step 1A.

In this step, basically, the dibenzoxaphosphane-oxide-based compound obtained in step 1A is reacted with a chlorinating agent to be chlorinated. As the chlorinating agent, various known chlorinating agents can be used. For example, carbon tetrachloride, chlorine gas, sulfonyl chloride, trichloroisocyanuric acid (TCCA), or N-chlorosuccinimide (NCS) described in Non-Patent Document 10 can be used.

The chlorination reaction may proceed in the absence of a solvent or in a solvent. When a solvent is used, the usable solvent is not particularly limited as long as it hardly inhibits the chlorination reaction, but an aprotic solvent is preferable. Examples of the aprotic solvent may include organic solvents such as chlorobenzene, dichlorobenzene, toluene, xylene, and mesitylene. Among such aprotic solvents, chlorobenzene or toluene, which is available at low cost, is preferred. Two or more types of solvents may be used in combination by mixing or the like.

In the chlorination reaction, the reaction system may be heated. In this case, the heating temperature is usually preferably set to 40 to 100° C., but the heating temperature in the case of using the solvent is controlled within a range not exceeding the boiling point of the solvent. The progress of the chlorination reaction, that is, the degree of chlorination of the dibenzoxaphosphane-oxide-based compound can be controlled within a certain range by selecting the type of solvent and adjusting the reaction temperature.

When the mixture of dibenzoxaphosphane-oxide-based compounds is used in this step, a mixture of chloro-dibenzoxaphosphane-oxide-based compounds represented by Formula (16) corresponding to the mixture of dibenzoxaphosphane-oxide-based compounds is obtained in this step.

Step 1C

In this step, for example, in accordance with the description of Non-Patent Document 11 below, the chloro-dibenzoxaphosphane-oxide-based compound obtained in step 1B is reacted with an aminating agent to be converted into a target phosphonamidate-based compound.

[Non-Patent Document 11]

N. Kreutzkamp, H. Schindler, Arch. Pharm. (Weiheim), 1960, Vol. 293, p. 296-305.

In this step, one type of chloro-dibenzoxaphosphane-oxide-based compound or a mixture of two or more types of chloro-dibenzoxaphosphane-oxide-based compounds, obtained in step 1B, is used depending on the type of target phosphonamidate-based compound. The mixture of two or more types of compounds may be a mixture prepared by mixing two or more types of chloro-dibenzoxaphosphane-oxide-based compounds individually prepared in step 1B, or may be a mixture obtained by using a mixture of two or more types of dibenzoxaphosphane-oxide-based compounds in step 1B.

In this step, basically, the chloro-dibenzoxaphosphane-oxide-based compound obtained in step 1B is reacted with an aminating agent to be aminated. Various known aminating agents can be used. For example, ammonia water or ammonia gas described in Non-Patent Document 11 can be used.

The amination reaction may proceed in the absence of a solvent or in a solvent. When a solvent is used, the usable solvent is not particularly limited as long as it hardly inhibits the amination reaction, but an aprotic solvent is preferable. Examples of the aprotic solvent may include organic solvents such as chlorobenzene, dichlorobenzene, toluene, xylene, and mesitylene. Among such aprotic solvents, chlorobenzene or toluene, which is available at low cost, is preferred. Two or more types of solvents may be used in combination by mixing or the like.

In the amination reaction, the reaction system may be heated. In this case, the heating temperature is usually preferably set to 40 to 100° C., but the heating temperature in the case of using the solvent is controlled within a range not exceeding the boiling point of the solvent. The progress of the amination reaction, that is, the degree of amination of the chloro-dibenzoxaphosphane-oxide-based compound can be controlled within a certain range by selecting the type of solvent and adjusting the reaction temperature.

When the mixture of chloro-dibenzoxaphosphane-oxide-based compounds is used in this step, a mixture of phosphonamidate-based compounds represented by Formula (14) corresponding to the mixture of chloro-dibenzoxaphosphane-oxide-based compounds is obtained in this step.

Step 2:

In this step, for example, in accordance with the description of Non-Patent Document 12, the phosphonamidate-based compound obtained in step 1 is cyclized by an Appel reaction to be converted into a target cyclic phosphazene compound having an oxaphosphorin ring-containing structure.

[Non-Patent Document 12]

Rolf Appel, Heinz Einig, Chem. Ber. 1975, Vol. 108, p. 914.

In this step, one type of phosphonamidate-based compound or a mixture of two or more types of phosphonamidate-based compounds, obtained in step 1, is used depending on the type of oxaphosphorin ring-containing structure of the target cyclic phosphazene compound. The mixture of two or more types of compounds may be a mixture prepared by mixing two or more types of phosphonamidate-based compounds individually prepared in step 1, or may be a mixture obtained by using a mixture of two or more types of chloro-dibenzoxaphosphane-oxide-based compounds in step 1C of step 1.

In this step, basically, the phosphonamidate-based compound obtained in step 1 is cyclized by an Appel reaction with a phosphine such as triarylphosphine or trialkylphosphine, carbon tetrachloride, and a tertiary amine such as triethylamine or diisopropylethylamine.

The cyclization reaction in this step may proceed in the absence of a solvent or in a solvent. When a solvent is used, the usable solvent is not particularly limited as long as it hardly inhibits the cyclization reaction, but an aprotic solvent is preferable. Examples of the aprotic solvent may include organic solvents such as chlorobenzene, dichlorobenzene, toluene, xylene, and mesitylene. Among such aprotic solvents, chlorobenzene or toluene, which is available at low cost, is preferred. Two or more types of solvents may be used in combination by mixing or the like.

In the cyclization reaction, the reaction system may be heated. In this case, the heating temperature is usually preferably set to 40 to 170° C., but the heating temperature in the case of using the solvent is controlled within a range not exceeding the boiling point of the solvent. The progress of the cyclization reaction, that is, the degree of multimerization such as trimerization and tetramerization of the phosphonamidate-based compound can be controlled within a certain range by selecting the type of solvent and adjusting the reaction temperature.

The target cyclic phosphazene compound having an oxaphosphorin ring-containing structure obtained in this step is usually obtained as a mixture of a plurality of types of compounds having different numbers of repeating units of Formula (1). In addition, when one type of phosphonamidate-based compound is used in this step, the oxaphosphorin ring-containing structure of each repeating unit of Formula (1) is the same in the target cyclic phosphazene compound. When two or more types of phosphonamidate-based compounds are used in this step, the oxaphosphorin ring-containing structure of each repeating unit of Formula (1) is two or more types in the target cyclic phosphazene compound.

The target cyclic phosphazene compound having an oxaphosphorin ring-containing structure obtained in this step can be usually isolated and purified from the reaction system by an ordinary method such as filtration, solvent extraction, separation by column chromatography, or recrystallization.

<Resin Composition>

The resin composition of the present invention contains the cyclic phosphazene compound having an oxaphosphorin ring-containing structure according to the present invention and a resin component. As the cyclic phosphazene compound having an oxaphosphorin ring-containing structure of the present invention, two or more types thereof may be used in combination.

The resin component is not particularly limited, and various thermoplastic resins or thermosetting resins can be used. The thermosetting resin and the thermoplastic resin may be used in combination. The resin component may be natural or synthetic. Rubber and elastomers are also included in the category of the resin component.

Examples of usable thermosetting resins include an epoxy resin, a phenol resin, a melamine resin, a urea resin, a silicone resin, a polyurethane resin, an unsaturated polyester resin, a diallyl phthalate resin, a thermosetting acrylic resin, a polyimide resin, a polycarbodiimide resin, a maleimide resin, a maleimide-cyanic acid ester resin, a cyanic acid ester resin, a benzoxazine resin, a polybenzimidazole resin, a benzocyclobutene resin, natural rubber, isoprene rubber, styrene-butadiene rubber, butadiene rubber, butyl rubber, ethylene-propylene-diene rubber, acrylonitrile-butadiene rubber, styrene-isoprene-butadiene rubber, and chloroprene rubber. Two or more types of thermosetting resins may be used in combination. Among the above examples, polyimide-based resins such as a polyimide resin, a polycarbodiimide resin, a maleimide resin, or a maleimide-cyanic acid ester resin can be used in combination with each of the corresponding resins having thermoplasticity or solvent-solubility from the viewpoint of improving the handling processability and adhesiveness.

As the epoxy resin exemplified as the thermosetting resin, various epoxy resins can be used as long as it is a compound having two or more epoxy groups in one molecule. Specific examples thereof include a novolak-type epoxy resin obtained by a reaction of phenols with aldehydes, such as a phenol novolak-type epoxy resin, a brominated phenol novolak-type epoxy resin, an orthocresol novolak-type epoxy resin, a biphenyl novolak-type epoxy resin, a bisphenol-A novolak-type epoxy resin, and a naphthol novolak-type epoxy resin; a phenol-type epoxy resin obtained by a reaction of phenols such as tris(hydroxyphenyl) methane with epichlorohydrin such as a bisphenol-A-type epoxy resin, a brominated bisphenol-A-type epoxy resin, a bisphenol-F-type epoxy resin, a bisphenol-AD-type epoxy resin, a bisphenol-S-type epoxy resin, a biphenol-type epoxy resin, a naphthalene-type epoxy resin, a cyclopentadiene-type epoxy resin, an alkyl-substituted biphenol-type epoxy resin, a polyfunctional phenol-type epoxy resin; an aliphatic epoxy resin obtained by a reaction of alcohols such as trimethylolpropane, oligopropylene glycol, and hydrogenated bisphenol-A with epichlorohydrin; a glycidyl ester-based epoxy resin obtained by a reaction of hexahydrophthalic acid, tetrahydrophthalic acid, or phthalic acid with epichlorohydrin or 2-methylepichlorohydrin; a glycidylamine-based epoxy resin obtained by a reaction of amines such as diaminodiphenylmethane and aminophenol with epichlorohydrin; a heterocyclic epoxy resin obtained by a reaction of polyamines such as isocyanuric acid with epichlorohydrin; a phosphazene compound having a glycidyl group, an epoxy-modified phosphazene resin, an isocyanate-modified epoxy resin, a cyclic aliphatic epoxy resin, and a urethane-modified epoxy resin. When the resin composition of the present invention is used as a material for producing an electric or electronic component, it is particularly preferable to use, among the epoxy resins described above, a phenol novolak-type epoxy resin, an orthocresol novolak-type epoxy resin, a bisphenol-A-type epoxy resin, a biphenol-type epoxy resin, a biphenyl novolak-type epoxy resin, a naphthalene-type epoxy resin, a polyfunctional phenol-type epoxy resin, or a phenol-type epoxy resin obtained by a reaction of tris(hydroxyphenyl) methane with epichlorohydrin. Two or more types of epoxy resins may be used in combination.

Examples of usable thermoplastic resins include a polyolefin resin (for example, a polyethylene resin, a polypropylene resin, a polyisoprene resin, a polybutylene resin, a cyclic polyolefin (COP) resin, and a cyclic olefin copolymer (COC) resin), a chlorinated polyolefin resin (for example, a polyvinyl chloride resin and a polyvinylidene chloride resin), a styrene-based resin (for example, a polystyrene resin, an impact-resistant polystyrene (HIPS) resin, a syndiotactic polystyrene (SPS) resin, an acrylonitrile-butadiene-styrene copolymer (ABS resin), an acrylonitrile-styrene copolymer (AS resin), a methyl methacrylate-butadiene-styrene copolymer (MBS resin), a methyl methacrylate-acrylonitrile-butadiene-styrene copolymer (MABS resin), and an acrylonitrile-acrylic rubber-styrene copolymer (AAS resin)), polymethyl acrylate (PMA), polymethyl methacrylate (PMMA), polyvinyl alcohol, a polyester resin (for example, a polyethylene terephthalate resin, a polypropylene terephthalate resin, a polytrimethylene terephthalate resin, a polybutylene terephthalate resin, a polymethylene terephthalate resin, a polyethylene naphthalate resin, a polycyclohexylene-dimethylene terephthalate resin, and a polylactic acid resin), an aliphatic polyamide resin (for example, a polyamide 6 resin, a polyamide 66 resin, a polyamide 11 resin, a polyamide 12 resin, a polyamide 46 resin, a copolymer of a polyamide 6 resin and a polyamide 66 resin (polyamide 6/66 resin), and a copolymer of a polyamide 6 resin and a polyamide 12 resin (polyamide 6/12 resin)), a semi-aromatic polyamide resin (for example, a resin composed of a structural unit having an aromatic ring and a structural unit having no aromatic ring, such as a polyamide MXD6 resin, a polyamide 6T resin, a polyamide 9T resin, and a polyamide 10T resin), a polyacetal (POM) resin, a polycarbonate resin, a phenoxy resin, a polyphenylene ether-based resin, a polysulfone-based resin, a polyethersulfone resin, a polyphenylene sulfide resin, a polyethernitrile resin, a polythioethersulfone resin, a polyarylate resin, a polyamide-imide resin, a polyetherimide resin, a polyether aromatic ketone resin (for example, a polyether ketone resin, a polyether ketone ketone resin, a polyether ether ketone ketone resin, and a polyether ether ketone resin), a thermoplastic polyimide (TPI) resin, a liquid crystal polymer (LCP) resin (a liquid crystal polyester resin or the like), a polyamide-based thermoplastic elastomer, a polyester-based thermoplastic elastomer, and a polybenzimidazole resin. Two or more types of thermoplastic resins may be used in combination.

As the polyphenylene ether-based resin exemplified as the thermoplastic resin, a modified polyphenylene ether-based resin can also be used. The modified polyphenylene ether-based resin is obtained by, for example, introducing one or more types of reactive functional groups such as an acryloyloxy group, a methacryloyloxy group, a styryl group, a vinyl group, a carboxyl group, an epoxy group, an amino group, a hydroxyl group, and an anhydrous dicarboxyl group into part or the whole of the polyphenylene ether-based resin by a graft reaction, copolymerization or other methods. The modified polyphenylene ether-based resin may also be one whose terminal has been modified with a substituent having a carbon-carbon unsaturated double bond. Examples of the substituent having a carbon-carbon unsaturated double bond for terminal modification include at least one substituent selected from the group consisting of a vinylphenyl group, a vinylbenzyl group, an acryloyl group, and a methacryloyl group. The modified polyphenylene ether-based resin whose terminal has been modified with a substituent having a carbon-carbon unsaturated double bond can also be used by adding another compound having a carbon-carbon unsaturated double bond in the molecule.

When the resin composition of the present invention is used for a material for producing an electric or electronic component, particularly for a sealing material for various IC elements, a substrate material for a wiring board, an insulating material such as an interlayer insulating material or an insulating adhesive material, an insulating material for a Si substrate or a SiC substrate, a conductive material or a surface protective material, or a housing or components of an OA device, an AV device, a communication device, or a home electric appliance, it is preferable to use an epoxy resin, a phenol resin, an unsaturated polyester resin, a diallyl phthalate resin, a maleimide resin, a polyimide resin, a benzoxazine resin, a benzocyclobutene resin, a polyolefin resin, a styrene-based resin, a polyester resin, an aliphatic polyamide resin, a semi-aromatic polyamide resin, a polycarbonate resin, a polyphenylene ether-based resin, a polyarylate resin, or a modified resin thereof as the thermosetting resin or the thermoplastic resin that can be used therefor. Two or more types of these resin components may be used in combination as necessary.

In the resin composition of the present invention, the amount of use of the cyclic phosphazene compound having an oxaphosphorin ring-containing structure can be appropriately set in light of various conditions such as the type of the resin component and the use of the resin composition. The amount is usually preferably set to 0.1 to 200 parts by mass, more preferably set to 0.5 to 100 parts by mass, and particularly preferably set to 1 to 50 parts by mass, with respect to 100 parts by mass of the resin component in terms of solid content. When the amount of the cyclic phosphazene compound having an oxaphosphorin ring-containing structure is less than 0.1 parts by mass, there is a possibility that a resin molded body made of the resin composition does not exhibit sufficient flame retardancy. On the other hand, when the amount is more than 200 parts by mass, the original properties of the resin component may be impaired, and a resin molded body having the expected properties may not be obtained.

In the resin composition of the present invention, various additives can be blended depending on the type of the resin component, the use of the resin composition, and the like as long as the target physical properties are not impaired. Examples of usable additives include inorganic fillers such as natural silica, calcined silica, synthetic silica, amorphous silica, white carbon, alumina, aluminum hydroxide, magnesium hydroxide, calcium silicate, calcium carbonate, zinc borate, zinc stannate, titanium oxide, zinc oxide, molybdenum oxide, zinc molybdate, natural mica, synthetic mica, AEROSIL, kaolin, clay, talc, calcined kaolin, calcined clay, calcined talc, wollastonite, glass short fibers, glass fine powders, hollow glass, and potassium titanate fibers; surface treatment agents for fillers, such as silane coupling agents; release agents such as waxes, fatty acids and metal salts thereof, acid amides, and paraffins; flame retardants including: phosphorus-based flame retardants such as phosphoric acid esters, condensed phosphoric acid esters, phosphoric acid amides, phosphoric acid amide esters, phosphine oxides, bis(diphenylphosphine) oxides, phosphazenes, phosphinates, phosphinate salts, ammonium phosphate, and red phosphorus; nitrogen-based flame retardants such as melamine, melamine cyanurate, melam, melem, melon, and succinoguanamine; chlorinated paraffin; silicone-based flame retardants; and bromine-based flame retardants; flame retardant aids such as antimony trioxide; dripping inhibitors such as polytetrafluoroethylene (PTFE); ultraviolet absorbers such as benzotriazole; antioxidants such as hindered phenol and styrenated phenol; photopolymerization initiators such as thioxanthone-based photopolymerization initiators; fluorescent brighteners such as stilbene derivatives; epoxy resins, phenol resins, curing agents, dyes, pigments, colorants, photostabilizers, photosensitizers, thickeners, lubricants, defoamers, leveling agents, gloss agents, polymerization inhibitors, thixotropy imparting agent plasticizers, and antistatic agents. Two or more types of additives may be used in combination as necessary.

When a thermosetting resin is used as the resin component in the resin composition of the present invention, a curing agent or a curing accelerator is generally used in combination. The type of usable curing agent or curing accelerator is not particularly limited as long as it is generally used for the thermosetting resin. Typical examples thereof include polyamine compounds such as an aromatic polyamine, a polyamide polyamine, and an aliphatic polyamine; phenolic compounds such as phenol novolac and cresol novolac; acid anhydrides such as hexahydrophthalic anhydride and methyltetrahydrophthalic anhydride; phosphazene compounds having a hydroxyl group; Lewis acids such as boron trifluoride and salts thereof; imidazoles; dicyandiamides; and organic metal salts. Two or more types of these substances can be appropriately mixed and used.

When the resin composition of the present invention is used as a material for producing an electric or electronic component, an epoxy resin is used as a typical resin component. The amount of the curing agent contained in the resin composition containing an epoxy resin as a resin component (hereinafter, referred to as an "epoxy resin composition") is usually preferably set to 0.5 to 1.5 equivalents, and more preferably set to 0.6 to 1.2 equivalents, with respect to 1 equivalent of epoxy groups of the epoxy resin.

The epoxy resin composition usually preferably contains a curing accelerator in addition to the curing agent and additives described above. Various known curing accelerators can be used, and are not particularly limited. Example of usable curing accelerators include imidazole-based compounds such as 2-methylimidazole or 2-ethylimidazole; tertiary amine-based compounds such as 2-(dimethylaminomethyl) phenol; or triphenylphosphine compounds. The amount of the curing accelerator used is usually preferably set to 0.01 to 15 parts by mass, and more preferably set to 0.1 to 10 parts by mass with respect to 100 parts by mass of the epoxy resin.

The epoxy resin composition may contain a known reactive diluent as necessary. Various known reactive diluents can be used, and examples thereof include, but are not particularly limited to, aliphatic alkyl glycidyl ethers such as butyl glycidyl ether, 2-ethylhexyl glycidyl ether, and allyl glycidyl ether; alkyl glycidyl esters such as glycidyl methacrylate and tertiary carboxylic acid glycidyl ester; styrene oxide; and aromatic alkyl glycidyl ethers such as phenyl glycidyl ether, cresyl glycidyl ether, p-s-butylphenyl glycidyl ether, and nonylphenyl glycidyl ether. Two or more types of these reactive diluents may be used in combination.

The resin composition of the present invention such as an epoxy resin composition is prepared by uniformly mixing respective components. When the resin composition containing a thermosetting resin is left to stand for 1 to 36 hours in a temperature range of about 100 to 250° C. depending on the resin component, a sufficient curing reaction proceeds to form a cured product. For example, when the epoxy resin composition is usually left to stand at a temperature of 150 to 250° C. for 2 to 15 hours, a sufficient curing reaction proceeds to form a cured product. The cyclic phosphazene compound having an oxaphosphorin ring-containing structure of the present invention has a high melting point and low solubility. Therefore, the cyclic phosphazene compound can enhance the flame retardancy without impairing the mechanical properties (in particular, the glass transition temperature) of the cured product of the resin composition, and also achieve good dielectric properties, particularly, Low Dk/Df. Accordingly, the resin composition of the present invention can be widely used as a material for production of various resin molded bodies, for coating materials, for adhesives, and for other uses. In particular, the resin composition of the present invention is suitable as a material for producing an electric or electronic component, for example, a material for sealing a semiconductor or forming a circuit board (in particular, a metal-clad laminate, a substrate for a printed wiring board, an adhesive for a printed wiring board, an adhesive sheet for a printed wiring board, an insulating circuit protective film for a printed wiring board, a conductive paste for a printed wiring board, a sealing agent for a multilayer printed wiring board, a circuit protective agent, a cover lay film, and a cover ink).

EXAMPLES

Hereinafter, the present invention will be specifically described with reference to Examples, Comparative Examples, and the like, but the present invention is not limited thereto at all. In the following description, unless otherwise specified, "%" and "part" mean "mass %" and "part by mass", respectively.

The phosphazene compounds obtained in Examples, Synthesis Examples, and the like were identified based on the results of measurement of a $^1$H-NMR spectrum and a $^{31}$P-NMR spectrum, CHN elemental analysis, analysis of a chlorine element (residual chlorine) by potentiometric titration using silver nitrate after alkali melting, analysis of a phosphorus element by inductively coupled plasma atomic emission spectrometry (ICP-AES) after microwave wet decomposition, analysis using a high-resolution mass spectrometer (HRMS) by electrospray ionization (ESI), and the like.

Phosphorus-based flame retardants used in Examples and Comparative Examples are as follows.

Phosphorus-based flame retardant Y: Phosphoric acid ester (trade name "CR-741" manufactured by DAIHACHI CHEMICAL INDUSTRY CO., LTD.)

Phosphorus-based flame retardant Z: Phosphine oxide (trade name "PQ-60" manufactured by Chin Yee Chemical Industries Co., Ltd., Taiwan)

Synthesis Example 1 (Synthesis of 6-chloro-6H-dibenzo[c,e][1,2]oxaphosphorin)

Synthesis of 6-chloro-6H-dibenzo[c,e][1,2]oxaphosphorin was attempted according to the method described in Stephen D. Pastor, John D. Spivack, Leander P. Steinhuebel, Phosphorus and Sulfur, 1987, Vol. 31, p. 71. (Non-Patent Document 3 listed earlier). It was confirmed that the obtained compound was a target 6-chloro-6H-dibenzo[c,e][1,2]oxaphosphorin (yield: 85%), from the fact that the obtained compound had a melting point of 81 to 83° C. and the measurement results of the $^1$H-NMR spectrum and the $^{31}$P-NMR spectrum.

Synthesis Example 2 (Synthesis of 6-chloro-4-phenyl-6H-dibenzo[c,e][1,2]oxaphosphorin)

Synthesis of 6-chloro-4-phenyl-6H-dibenzo[c,e][1,2]oxaphosphorin was attempted according to the method described in Asfia Qureshi, Allan S. Hay, J. Chem. Res (M), 1998, p. 1, 601. (Non-Patent Document 4 listed earlier). It was confirmed that the obtained compound was a target 6-chloro-4-phenyl-6H-dibenzo[c,e][1,2]oxaphosphorin (yield: 81%), from the fact that the compound had a melting point of 101 to 103° C. and the measurement results of the $^1$H-NMR spectrum and the $^{31}$P-NMR spectrum.

Example 1 (Production of Cyclic Phosphazene Compound Having Oxaphosphorin Ring-Containing Structure by Production Method 1)

A 5,000 mL four-necked flask equipped with a thermometer, a stirrer, and a condenser was charged with 234.6 g (1.0 mol) of 6-chloro-6H-dibenzo[c,e][1,2]oxaphosphorin synthesized in Synthesis Example 1, 115.2 g (1.0 mol) of trimethylsilyl azide, and 2,000 mL of toluene under a nitrogen stream, and the resulting mixture in the flask was stirred at 50° C. for 24 hours. The reaction mixture was cooled to room temperature, 1,000 mL of ion-exchanged water was then added thereto, and the mixture was stirred at room temperature for 1 hour. The slurry liquid thus obtained was filtered, and the resulting filtrate was washed with toluene and ion-exchanged water, and the resulting wet crystals were dried to obtain 177.8 g of a white powder (yield: 83.4%). The analysis results of this white powder were as follows.
$^1$H-NMR spectrum (δ, ppm in deuterated chloroform):
  6.0 to 8.3 (m)
$^{31}$P-NMR spectrum (δ, ppm in deuterated chloroform):
  −10 to 0 (m), 1.8 to 3.5 (m), 15.8 (d), 17.5 (s), 17.9 (dd)
CHNP Elemental Analysis:
  Theoretical value C: 67.61%, H: 3.78%, N: 6.57%, P: 14.53%
  Actual value C: 67.49%, H: 3.79%, N: 6.55%, P: 14.49%
Residual Chlorine Analysis:
  <0.01%
HRMS (ESI, m/z):
  Theoretical value Trimer: $[C_{36}H_{24}N_3O_3P_3+H]^+$: 640.1109, tetramer: $[C_{48}H_{32}N_4O_4P_4+H]^+$: 853.1452, pentamer: $[C_{60}H_{40}N_5O_5P_5+H]^+$: 1066.1796
  Actual value 640.1097, 853.1444, 1066.1797
From the above analysis results, it was confirmed the obtained white powder was a mixture of $N_3P_3(OC_6H_4$—$C_6H_4)_3$, $N_4P_4(OC_6H_4$—$C_6H_4)_4$, and $N_5P_5(OC_6H_4$—$C_6H_4)_5$, and was a cyclic phosphazene compound having an oxaphosphorin ring-containing structure, the compound having an average composition of $[NP(OC_6H_4$—$C_6H_4)]_{3.6}$.

Example 2 (Isolation of Trimeric-Cis Isomer from Cyclic Phosphazene Compound Obtained in Example 1)

A 2,000 mL four-necked flask equipped with a thermometer, a stirrer, and a condenser was charged with 150.0 g of the white powder obtained in Example 1 and 1,500 mL of toluene, and the resulting mixture in the flask was stirred under reflux for 3 hours, then cooled to room temperature, and further stirred for 2 hours. A filtrate obtained by filtrating the slurry liquid thus obtained was washed with toluene, and the obtained crystals were dried to obtain 36.6 g of colorless crystals. The analysis results of the colorless crystals were as follows.
$^1$H-NMR spectrum (δ, ppm in deuterated chloroform):
  7.17 (3H, td), 7.35 (3H, td), 7.40 (3H, dd), 7.47 (3H, t), 7.61 (3H, td), 7.85 (3H, dd), 7.89 (3H, m)
$^{31}$P-NMR spectrum (δ, ppm in deuterated chloroform):
  17.5 (s)
CHNP Elemental Analysis:
  Theoretical value C: 67.61%, H: 3.78%, N: 6.57%, P: 14.53%
  Actual value C: 67.59%, H: 3.80%, N: 6.61%, P: 14.55%
Residual Chlorine Analysis:
  <0.01%
HRMS (ESI, m/z):
  Theoretical value Trimer: $[C_{36}H_{24}N_3O_3P_3+H]^+$: 640.1109
  Actual value 640.1097
From the above analysis results, it was confirmed that the obtained colorless crystals were a cyclic phosphazene compound having an oxaphosphorin ring-containing structure of cis-form $N_3P_3(OC_6H_4$—$C_6H_4)_3$.

Example 3 (Isolation of Trimeric-Trans Isomer and Tetramer from Cyclic Phosphazene Compound Obtained in Example 1)

A mother liquor obtained by filtrating the slurry in Example 2 was concentrated by an evaporator, and the obtained solid was separated and purified by silica gel column chromatography (developing solvent: toluene/ethyl acetate=9/1) to obtain fractions of a trimeric-trans isomer and a tetramer contained in the cyclic phosphazene compound obtained in Example 1. Each fraction was concentrated under reduced pressure, then methanol was added thereto, and the resulting mixture was filtrated. The filtrate was washed with methanol to obtain crystals, and the crystals were dried. This gave 86.7 g of colorless crystals of a trimeric-trans isomer and 15.9 g of a white powder of a tetramer. The analysis results of these are as follows.
Colorless Crystals of Trimeric-Trans Isomer:
  $^1$H-NMR spectrum (δ, ppm in deuterated chloroform):
    7.18 (3H, m), 7.33 (3H, m), 7.52 (2H, m), 7.63 (4H, m), 7.88 (6H, m), 8.03 (2H, m), 8.25 (1H, ddd)
  $^{31}$P-NMR spectrum (δ, ppm in deuterated chloroform):
    15.8 (d), 17.9 (dd)
  CHNP Elemental Analysis:
    Theoretical value C: 67.61%, H: 3.78%, N: 6.57%, P: 14.53%

Actual value C: 67.51%, H: 3.81%, N: 6.54%, P: 14.48%
Residual Chlorine Analysis:
<0.01%
HRMS (ESI, m/z):
Theoretical value Trimer: $[C_{36}H_{24}N_3O_3P_3+H]^+$: 640.1109
Actual value 640.1097
From the above analysis results, it was confirmed that the obtained colorless crystals were a cyclic phosphazene compound having an oxaphosphorin ring-containing structure of trans-form $N_3P_3(OC_6H_4—C_6H_4)_3$.
White Powder of Tetramer
$^1$H-NMR spectrum (δ, ppm in deuterated chloroform):
6.5 to 7.8 (m)
$^{31}$P-NMR spectrum (δ, ppm in deuterated chloroform):
1.8 to 3.5 (m)
CHNP Elemental Analysis:
Theoretical value C: 67.61%, H: 3.78%, N: 6.57%, P: 14.53%
Actual value C: 67.52%, H: 3.83%, N: 6.52%, P: 14.51%
Residual Chlorine Analysis:
<0.01%
HRMS (ESI, m/z):
Theoretical value Tetramer: $[C_{48}H_{32}N_4O_4P_4+H]^+$: 853.1452
Actual value 853.1444
From the above analysis results, it was confirmed that the obtained white powder was a mixture of five types of isomers including a cis-form, an α-trans form, a β-trans form, and a γ-trans form, and an enantiomer of a cyclic phosphazene compound having an oxaphosphorin ring-containing structure of $N_4P_4(OC_6H_4—C_6H_4)_4$. For the names of the stereoisomers of the tetramer, the nomenclature in Non-Patent Document 13 below was referred to.
[Non-Patent Document 13]
Bernard Grushkin, Alvin J. Berlin, James L. McClanaham, Rip G. Rice, Inorg. Chem., 1966, Vol. 5, p. 172.

Example 4 (Production of Cyclic Phosphazene Compound Having Oxaphosphorin Ring-Containing Structure by Production Method 1)

The same procedure was carried out as in Example 1 except that 310.7 g (1.0 mol) of 6-chloro-4-phenyl-6H-dibenzo[c,e][1,2]oxaphosphorin synthesized in Synthesis Example 2 was used in place of 6-chloro-6H-dibenzo[c,e][1,2]oxaphosphorin synthesized in Synthesis Example 1, to obtain 274.2 g of a white powder (yield: 94.8%). The analysis results of this white powder were as follows.
$^1$H-NMR spectrum (δ, ppm in deuterated chloroform):
6.0 to 8.3 (m)
$^{31}$P-NMR spectrum (δ, ppm in deuterated chloroform):
−10 to 0 (m), 1.5 to 3.2 (m), 15.5 (d), 17.1 (s), 17.8 (dd)
CHNP Elemental Analysis:
Theoretical value C: 74.74%, H: 4.18%, N: 4.84%, P: 10.71%
Actual value C: 74.70%, H: 4.19%, N: 4.72%, P: 10.66%
Residual Chlorine Analysis:
<0.01%
HRMS (ESI, m/z):
Theoretical value Trimer: $[C_{54}H_{36}N_3O_3P_3+H]^+$: 868.2048, tetramer: $[C_{72}H_{48}N_4O_4P_4+H]^+$: 1157.2704, pentamer: $[C_{90}H_{60}N_5O_5P_5+H]^+$: 1446.3361
Actual value 868.2039, 1157.2712, 1146.3372
From the above analysis results, it was confirmed that the obtained white powder was a mixture of $N_3P_3[OC_6H_3(C_6H_5)—C_6H_4]_3$, $N_4P_4[OC_6H_3(C_6H_5)—C_6H_4]_4$ and $N_5P_5[OC_6H_3(C_6H_5)—C_6H_4]_5$, and was a cyclic phosphazene compound having an oxaphosphorin ring-containing structure, the compound having an average composition of $\{NP[OC_6H_3(C_6H_5)—C_6H_4]\}_{3.5}$.

Examples 5 to 10 and Comparative Examples 1 to 2 (Production of Resin Molded Bodies)

A polyphenylene ether oligomer (trade name "SA-9000" of SABIC) whose terminal had been modified with a vinyl group, a styrene-butadiene copolymer (trade name "RICON 184" of CRAY VALLEY), either one of the phosphazene compounds produced in Examples 1 to 4, a phosphorus-based flame retardant Y or Z, a polymerization initiator ("t-Butyl Peroxide" reagent from Tokyo Chemical Industry Co., Ltd.), and methyl ethyl ketone (MEK) were blended and stirred in the proportions shown in Table 2 to prepare a varnish. The varnish was applied onto a polyethylene terephthalate resin film, and this was allowed to stand at room temperature for 1 hour, and then further dried at 90° C. for 30 minutes. The dried coating film was peeled off and placed in a spacer made of a polytetrafluoroethylene resin, and was heated in the order of 120° C. for 30 minutes, 150° C. for 30 minutes, and 180° C. for 100 minutes under vacuum and pressurized to be cured, to obtain a molded body having a size suitable for the evaluation described later.

Examples 11 to 15 and Comparative Examples 3 to 4 (Production of Resin Molded Bodies)

To a mixture of 651 parts of a bisphenol A-type epoxy resin (trade name "EPIKOTE 1001" of Japan Epoxy Resins Co., Ltd./epoxy equivalent: 456 g/eq., resin solid content: 70%), 300 parts of a cresol novolac epoxy resin (trade name "YDCN-704P" of TOHTO Chemical Industry Co., Ltd./epoxy equivalent: 210 g/eq., resin solid content: 70%), 303 parts of a novolac-type phenol resin (trade name "BRG-558" of Showa Highpolymer Co., Ltd./hydroxyl group equivalent: 106 g/eq., resin solid content: 70%), 361 parts of aluminum hydroxide, and 0.9 parts of 2-ethyl-4-methylimidazole, either one of the phosphazene compounds produced in Examples 1 to 4 and a phosphorus-based flame retardant Y or Z were added in the proportions shown in Table 3, and propylene glycol monomethyl ether (PGM) was further added thereto as a solvent, to prepare an epoxy resin varnish having a resin solid content of 65%.
Next, a 180 μm glass woven fabric was impregnated with the prepared epoxy resin varnish by coating, and the varnish was dried at a temperature of 160° C. to produce a prepreg. Eight sheets of the prepreg were laminated, and the laminate was heated and pressurized at a temperature of 170° C. and a pressure of 4 MPa for 100 minutes, to obtain a resin molded body having a size suitable for the evaluation described later.

Examples 16 to 21 and Comparative Examples 5 to 6 (Production of Resin Molded Bodies)

A thermoplastic resin (polyphthalamide: trade name "Amodel AE-1133" of SOLVAY S.A.) which had been previously dried at 100° C. for 8 hours, either one of the phosphazene compounds produced in Examples 1 to 4, and a phosphorus-based flame retardant Y or Z were supplied to a twin-screw kneading extruder (a product of Toyo Seiki Co., Ltd.) at the proportions shown in Table 4, and kneaded at 310° C. to obtain resin pellets. Using an injection molding machine (a product of Digital Factory Corporation), the obtained resin pellets were molded under the conditions of a resin temperature of 300° C. and a mold temperature of 120° C., to obtain a resin molded body having a size suitable for the evaluation described later.

EVALUATION

The resin molded bodies obtained in Examples 5 to 21 and Comparative Examples 1 to 6 were evaluated for flame retardancy, dielectric properties, and heat resistance. The evaluation methods are as follows. The results are shown in Tables 2 to 4.

<Flammability>

A resin molded body having a length of 125 mm, a width of 12.5 mm, and a thickness of 1.5 mm was used as a specimen, and the flammability of this specimen was evaluated. Here, based on the vertical burning test of UL-94 standard released by Underwriter's Laboratories Inc., the flammability was determined in four levels of V-0, V-1, V-2, and substandard, according to the total burning time of 10 times of flame contacts and the presence or absence of cotton ignition by drips at the time of burning. The evaluation of each level is as follows. The level of flame retardancy is highest at V-0, and decreases in the order of V-1, V-2, and substandard.

V-0: The following conditions are all satisfied.
(A) Each of five specimens is brought into contact with flame twice, and the total of the extinction times after total 10 times of flame contacts is within 50 seconds.
(B) Each of five specimens is brought into contact with flame twice, and the extinction time after each flame contact is within 5 seconds.
(C) There is no ignition of the absorbent cotton located 300 mm below the specimen by drips in all specimens.
(D) Glowing after the second flame contact is within 30 seconds in all specimens.
(E) All specimens are not flamed until the clamp.

V-1: The following conditions are all satisfied.
(A) Each of five specimens is brought into contact with flame twice, and the total of the extinction times after total 10 times of flame contacts is within 250 seconds.
(B) Each of five specimens is brought into contact with flame twice, and the extinction time after each flame contact is within 30 seconds.
(C) There is no ignition of the absorbent cotton located 300 mm below the specimen by drips in all specimens.
(D) Glowing after the second flame contact is within 60 seconds in all specimens.
(E) All specimens are not flamed until the clamp.

V-2: The following conditions are all satisfied.
(A) Each of five specimens is brought into contact with flame twice, and the total of the extinction times after total 10 times of flame contacts is within 250 seconds.
(B) Each of five specimens is brought into contact with flame twice, and the extinction time after each flame contact is within 30 seconds.
(C) In at least one of the five specimens, the absorbent cotton located 300 mm below the specimen is ignited by drips.
(D) Glowing after the second flame contact is within 60 seconds in all specimens.
(E) All specimens are not flamed until the clamp.

<Dielectric Properties: Relative Dielectric Constant and Dielectric Loss Tangent>

A resin molded body having a length of 80 mm, a width of 3 mm and a thickness of 1.0 mm was used as a specimen. The relative dielectric constant (Dk) and the dielectric loss tangent (Df) of the specimen were measured under the conditions of a temperature of 25° C. and a frequency of 10 GHz according to JIS R1641 "Measurement method for dielectric of fine ceramic plates at microwave frequency".

<Glass Transition Temperature (Tg)>

The dynamic viscoelasticity (DMA) of the resin molded body was measured, and the maximum value of tan δ (loss modulus/storage modulus) was taken as the glass transition temperature (Tg). Here, the measurement was performed using a dynamic viscoelasticity measuring apparatus (trade name "DMA 8000" of PerkinElmer Japan Co., Ltd.) under a temperature rising condition of 5° C./min with a tensile module.

<Heat Resistance>

Test Condition 1:

The resin molded body was heated at 160° C. for 100 hours, and a bleed-out state on the surface of the resin molded body (a bleed-out state from the inside of the resin molded body) was visually observed and evaluated. The evaluation criteria are as follows. The more hardly the bleed-out is observed, the higher the heat resistance of the resin molded body is.

AA: No bleed-out is observed.
A: Bleed-out is hardly observed.
B: Slight bleed-out is observed.
C: Significant bleed-out is observed.

Test Condition 2:

The resin molded body was treated at 290° C. for 20 minutes, and then the presence or absence of a change in appearance due to bleed-out was observed. A case where there was no change in appearance was evaluated as having heat resistance, and a case where there was a change in appearance was evaluated as having no heat resistance.

TABLE 2

| | | Example | | | | | | Comparative Example | |
|---|---|---|---|---|---|---|---|---|---|
| | | 5 | 6 | 7 | 8 | 9 | 10 | 1 | 2 |
| Com-position | SA-9000/part | 73 | 77 | 73 | 73 | 73 | 73 | 73 | 73 |
| | RICON 184/part | 17 | 13 | 17 | 17 | 17 | 17 | 17 | 17 |
| | Phosphazene Type compound | Example 1 | Example 1 | Example 2 | Example 3*1 | Example 3*2 | Example 4 | 0 | 0 |
| | Part | 10 | 5 | 10 | 10 | 10 | 10 | | |
| | Phosphorus-based flame retardant Type | 0 | 0 | 0 | 0 | 0 | 0 | Y | Z |
| | Part | | | | | | | 10 | 10 |
| | Polymerization initiator/part | 1 | 1 | 1 | 1 | 1 | 1 | 1 | 1 |
| | MEK/part | 100 | 100 | 100 | 100 | 100 | 100 | 100 | 100 |

TABLE 2-continued

|  |  | Example |  |  |  |  |  | Comparative Example |  |
|---|---|---|---|---|---|---|---|---|---|
|  |  | 5 | 6 | 7 | 8 | 9 | 10 | 1 | 2 |
| Evaluation | Flame retardancy | V-0 | V-0 | V-0 | V-0 | V-0 | V-0 | V-1 | V-1 |
|  | Relative dielectric constant (Dk) | 3.2 | 3.1 | 3.1 | 3.1 | 3.2 | 3.3 | 4.6 | 3.7 |
|  | Dielectric loss tangent (Df) | 0.0021 | 0.0019 | 0.0017 | 0.0017 | 0.0020 | 0.0022 | 0.0100 | 0.0029 |
|  | Heat resistance (Test condition 1) | AA | AA | AA | AA | AA | AA | C | A |

*[1] Trimeric-trans isomer isolated from cyclic phosphazene compound obtained in Example 1
*[2] Tetramer isolated from cyclic phosphazene compound obtained in Example 1

According to Table 2, the resin molded bodies of Examples 5 to 10 have high flame retardancy, and also have Low Dk/Df owing to low relative dielectric constant Dk and dielectric loss tangent Df, which makes excellent dielectric properties, as compared with the resin molded bodies of Comparative Examples 1 and 2. Moreover, the resin molded bodies of Examples 5 to 10 have high reliability at a high temperature because the bleed-out of the cyclic phosphazene compound evaluated for heat resistance is not substantially observed.

TABLE 3

|  |  | Example |  |  |  |  | Comparative Example |  |
|---|---|---|---|---|---|---|---|---|
|  |  | 11 | 12 | 13 | 14 | 15 | 3 | 4 |
| Phosphazene compound | Type | Example 1 | Example 1 | Example 1 | Example 3*[1] | Example 3*[2] | 0 | 0 |
|  | Part | 80 | 40 | 60 | 80 | 80 |  |  |
| Phosphorus-based flame retardant | Type | 0 | 0 | 0 | 0 | 0 | Y | Z |
|  | Part |  |  |  |  |  | 80 | 80 |
|  | Flame retardancy | V-0 | V-0 | V-0 | V-0 | V-0 | V-0 | V-1 |
|  | Tg (° C.) | 180 | 185 | 182 | 180 | 183 | 139 | 153 |
|  | Heat resistance (Test condition 2) | Yes | Yes | Yes | Yes | Yes | No | No |

*[1] Trimeric-trans isomer isolated from cyclic phosphazene compound obtained in Example 1
*[2] Tetramer isolated from cyclic phosphazene compound obtained in Example 1

According to Table 3, the resin molded bodies of Examples 11 to 15 have a high glass transition temperature which produces good mechanical properties in addition to high flame retardancy, as compared with the resin molded bodies of Comparative Examples 3 and 4. Moreover, the resin molded bodies of Examples 11 to 15 have high reliability at a high temperature because the bleed-out of the cyclic phosphazene compound evaluated for heat resistance is substantially not observed.

TABLE 4

|  |  | Example |  |  |  |  |  | Comparative Example |  |
|---|---|---|---|---|---|---|---|---|---|
|  |  | 16 | 17 | 18 | 19 | 20 | 21 | 5 | 6 |
| Composition | Amodel AE-1133/part | 95 | 95 | 90 | 90 | 85 | 85 | 85 | 85 |
|  | Phosphazene compound Type | Example 1 | Example 2 | Example 1 | Example 3* | Example 1 | Example 4 | 0 | 0 |
|  | Part | 5 | 5 | 10 | 10 | 15 | 15 |  |  |
|  | Phosphorus-based flame retardant Type | 0 | 0 | 0 | 0 | 0 | 0 | Y | Z |
|  | Part |  |  |  |  |  |  | 15 | 15 |
| Evaluation | Flame retardancy | V-1 | V-1 | V-0 | V-0 | V-0 | V-0 | Substandard | V-2 |
|  | Relative dielectric constant (Dk) | 3.63 | 3.61 | 3.57 | 3.55 | 3.50 | 3.49 | 3.73 | 3.69 |

TABLE 4-continued

|  | Example | | | | | | Comparative Example | |
| --- | --- | --- | --- | --- | --- | --- | --- | --- |
|  | 16 | 17 | 18 | 19 | 20 | 21 | 5 | 6 |
| Dielectric loss tangent (Df) | 0.0102 | 0.0102 | 0.0097 | 0.0096 | 0.0093 | 0.0094 | 0.0110 | 0.0105 |
| Heat resistance (Test condition 1) | AA | AA | AA | AA | AA | AA | C | A |

*Tetramer isolated from cyclic phosphazene compound obtained in Example 1

According to Table 4, the resin molded bodies of Examples 16 to 21 have high flame retardancy, and also have Low Dk/Df owing to low relative dielectric constant Dk and dielectric loss tangent Df, which makes excellent dielectric properties, as compared with the resin molded bodies of Comparative Examples 5 and 6. Moreover, the resin molded bodies of Examples 16 to 21 have high reliability at a high temperature because the bleed-out of the cyclic phosphazene compound evaluated for heat resistance is not substantially observed.

Example 22 (Production of Cyclic Phosphazene Compound Having Oxaphosphorin Ring-Containing Structure by Production Method 2)

A toluene solution of 6-chloro-6H-dibenzo[c,e][1,2]oxaphosphorin obtained in Synthesis Example 1 was prepared, and chlorine gas was introduced into the solution for reaction to synthesize 6,6,6-trichloro-6H-dibenzo[c,e][1,2]oxaphosphorane. Here, from the following measurement results of the $^{31}$P-NMR spectrum of the reaction solution in the synthesis, it was confirmed that 6-chloro-6H-dibenzo[c,e][1,2]oxaphosphorine was converted into a target 6,6,6-trichloro-6H-dibenzo[c,e][1,2]oxaphosphorane. This reaction solution was used as it was for the next reaction. From the chloride ion content determined by a silver nitrate titration method, it was confirmed that the content of 6,6,6-trichloro-6H-dibenzo[c,e][1,2]oxaphosphorane in this reaction solution was 38.2% based on the chloride ion content determined by the silver nitrate titration method.

$^{31}$P-NMR spectrum (δ, ppm in deuterated chloroform):
−25.3 (s)

A 3,000 mL four-necked flask equipped with a thermometer, a stirrer, and a condenser was charged with 58.8 g (1.1 mol) of ammonium chloride and 1,500 mL of toluene under a nitrogen stream to prepare a slurry solution, and this slurry solution was heated. Then, to the refluxing slurry solution, 799.8 g (1.0 mol) of the reaction solution obtained in the above step, that is, a toluene solution of 6,6,6-trichloro-6H-dibenzo[c,e][1,2]oxaphosphorane was added dropwise over 18 hours. Thereafter, toluene was distilled off, and the reaction solution was concentrated until the temperature of the reaction solution finally reached 160° C., and then stirred at the same temperature for 15 hours. Subsequently, 500 mL of ion-exchanged water was added to this reaction solution, followed by stirring at room temperature for 1 hour. The slurry liquid thus obtained was filtrated to separate crystals, and the crystals were washed with ion-exchanged water and then dried to obtain 184.0 g of a white powder (yield: 86.3%). From the following analysis results, it was confirmed that this white powder was a dibenzoxaphosphorin ring-containing cyclic phosphazene compound represented by Formula (1) (with the proviso that it is a mixture of compounds in which a and b are 0 and n is an integer of 3 to 8).

$^{1}$H-NMR spectrum (δ, ppm in deuterated chloroform):
6.0 to 8.3 (m)
$^{31}$P-NMR spectrum (δ, ppm in deuterated chloroform):
−10 to 0 (m), 1.8 to 3.5 (m), 15.8 (d), 17.5 (s), 17.9 (dd)
CHNP Elemental Analysis:
Theoretical value C: 67.61%, H: 3.78%, N: 6.57%, P: 14.53%
Actual value C: 67.55%, H: 3.81%, N: 6.53%, P: 14.48%
Residual Chlorine Analysis:
<0.01%
HRMS Spectrum (ESI, m/z):
Theoretical value Trimer: $[C_{36}H_{24}N_3O_3P_3+H]^+$:
Actual value 640.1097, 853.1444, 1066.1797

Example 23 (Production of Cyclic Phosphazene Compound Having Oxaphosphorin Ring-Containing Structure by Production Method 3)

In a 3,000 mL four-necked flask equipped with a thermometer, a stirrer, and a condenser, 234.6 g (1.0 mol) of 6-chloro-6H-dibenzo[c,e][1,2]oxaphosphorin obtained in Synthesis Example 1 and 1, 500 mL of diethyl ether were charged under a nitrogen stream. To this mixture, 183 mL of a 6 M diethyl ether solution of chloroamine (chloroamine amount: 1.1 mol) prepared in advance was added dropwise while cooling so that the temperature of the reaction solution did not exceed 0° C. Then, diethyl ether was distilled off by heating the reaction solution, and the reaction solution was concentrated until the temperature of the reaction solution finally reached 160° C., and then stirred at the same temperature for 19 hours. To the reaction solution, 500 mL of ion-exchanged water was added, the mixture was stirred at room temperature for 1 hour, and the slurry liquid thus obtained was filtrated to separate crystals. Thereafter, the separated crystals were washed with ion-exchanged water and then dried to obtain 158.8 g of a light brown powder (yield: 74.5%). It was confirmed that this light brown powder was a dibenzoxaphosphorin ring-containing cyclic phosphazene compound represented by Formula (1) (with the proviso that it is a mixture of compounds in which a and b are 0 and n is an integer of 3 to 8), from the fact that the analysis results of the 1H-NMR, $^{31}$P-NMR and HRMS spectra matched the analysis results of the white powder obtained in Example 22.

Example 24 (Production of Cyclic Phosphazene Compound Having Oxaphosphorin Ring-Containing Structure by Production Method 4)

With reference to the descriptions in Patent Documents 11 and 12, 6-chloro-6H-dibenzo[c,e][1,2]oxaphosphorin obtained in Synthesis Example 1 was hydrolyzed to prepare 6H-dibenzo[c,e][1,2]oxaphosphorane-6-oxide. Then, the obtained 6H-dibenzo[c,e][1,2]oxaphosphorane-6-oxide was chlorinated according to the description of Non-Patent Document 10. From the measurement results of the $^1$H-NMR spectrum and $^{31}$P-NMR spectrum, it was confirmed that the product thus obtained was 6-chloro-6H-dibenzo[c,e][1,2]oxaphosphorane-2-oxide (yield: 94%).

Next, the obtained 6-chloro-6H-dibenzo[c,e][1,2]oxaphosphorane-2-oxide was aminated using ammonia water, according to the method described in Non-Patent Document 11. From the measurement results of the $^1$H-NMR spectrum and $^{31}$P-NMR spectrum, it was confirmed that the product thus obtained was 6-amino-6H-dibenzo[c,e][1,2]oxaphosphorane-2-oxide which was a phosphonamidate-based compound (yield: 89%).

A 10,000 mL four-necked flask equipped with a thermometer, a stirrer, and a condenser was prepared, and 231.2 g (1.0 mol) of the obtained 6-amino-6H-dibenzo[c,e][1,2]oxaphosphorane-2-oxide, 629.5 g (2.4 mol) of triphenylphosphine, 129.2 (1.0 mol) of N, N-diisopropylethylamine, and 4, 500 mL of xylene were charged in the flask under a nitrogen stream, and the mixture was heated. To the refluxing solution in the flask, 153.8 g (1.0 mol) of carbon tetrachloride was added dropwise over 2 hours, and the mixture was stirred for 4 hours. The solvent was distilled off from the reaction solution under reduced pressure, and 9,000 mL of methanol was added to the residue and stirred to obtain a slurry liquid. The slurry liquid was filtrated to separate crystals. Then, the separated crystals were washed with methanol and then dried to obtain 115.1 g of a white powder (yield: 54.0%). From the analysis results of the $^1$H-NMR and $^{31}$P-NMR spectra, it was confirmed that this white powder was a dibenzoxaphosphorin ring-containing cyclic phosphazene compound represented by Formula (1) (with the proviso that it is a mixture of compounds in which a and b are 0 and n is an integer of 3 to 8).

Example 25 (Production of Cyclic Phosphazene Compound Having Oxaphosphorin Ring-Containing Structure by Production Method 4)

The same procedure as in Example 24 was carried out except that 73.9 g (0.2 mol) of tetrabutylammonium iodide was added to the four-necked flask prepared in Example 24, and 99.0 g (1.0 mol) of 1,2-dichloroethane was used in place of carbon tetrachloride, to obtain 128.3 g of a white powder (yield: 60.2%). From the analysis results of the $^1$H-NMR and $^{31}$P-NMR spectra, it was confirmed that this white powder was a dibenzoxaphosphorin ring-containing cyclic phosphazene compound represented by Formula (1) (with the proviso that it is a mixture of compounds in which a and b are 0 and n is an integer of 3 to 8).

The invention claimed is:

1. A cyclic phosphazene compound having an oxaphosphorin ring-containing structure, the cyclic phosphazene compound being represented by the following Formula (1):

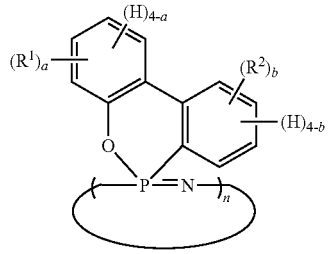

(1)

wherein n is an integer of 3 to 8,

R$^1$ and R$^2$ are (i) each independently any one of the groups of a nitro group, an alkyl group or an alkoxy group having 1 to 8 carbon atoms in which at least one group selected from the group consisting of alkyl groups having 1 to 6 carbon atoms and aryl groups may be substituted, and an aryl group or an aryloxy group having 6 to 20 carbon atoms in which at least one group selected from the group consisting of alkyl groups having 1 to 6 carbon atoms and aryl groups may be substituted; or (ii) forming, in-between them, a saturated or an unsaturated cyclic structure that may be substituted with an alkyl group having 1 to 6 carbon atoms or a carbonyl group, a and b are each independently an integer of 0 to 4, and a type of the oxaphosphorin ring-containing structure of each repeating unit is independent.

2. The cyclic phosphazene compound having an oxaphosphorin ring-containing structure according to claim 1, wherein n in Formula (1) is 3 or 4.

3. The cyclic phosphazene compound having an oxaphosphorine ring-containing structure according to claim 1, wherein n is 3, and a and b are 0 in Formula (1).

4. The cyclic phosphazene compound having an oxaphosphorin ring-containing structure according to claim 3, which is a mixture of diastereomers.

5. The cyclic phosphazene compound having an oxaphosphorin ring-containing structure according to claim 3, wherein a steric arrangement of the oxaphosphorin ring-containing structures adjacent to each other is a cis-cis-cis form.

6. The cyclic phosphazene compound having an oxaphosphorin ring-containing structure according to claim 3, wherein a steric arrangement of the oxaphosphorin ring-containing structures adjacent to each other is a trans-cis-trans form.

7. A mixture of cyclic phosphazene compounds having an oxaphosphorin ring-containing structure, the mixture comprising two or more types of the cyclic phosphazene compounds having an oxaphosphorin ring-containing structure according to claim 1.

8. A method for producing the cyclic phosphazene compound having an oxaphosphorin ring-containing structure according to claim 1, the method comprising:

step 1 of converting a chlorodibenzoxaphosphorin-based compound represented by the following Formula (2) into an azidated intermediate by using an azidating agent; and step 2 of subjecting the azidated intermediate to a cyclization reaction:

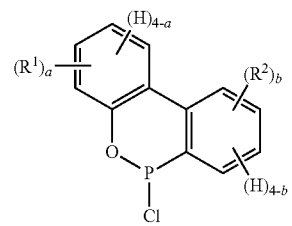

(2)

wherein R$^1$ and R$^2$ are (i) each independently any one of the groups of a nitro group, an alkyl group or an alkoxy group having 1 to 8 carbon atoms in which at least one group selected from the group consisting of alkyl groups having 1 to 6 carbon atoms and aryl groups may be substituted, and an aryl group or an aryloxy group having 6 to 20 carbon atoms in which at least one group selected from the group consisting of alkyl groups having 1 to 6 carbon atoms and aryl groups may be substituted; or (ii) forming, in-between them, a saturated or an unsaturated cyclic structure that may be substituted with an alkyl group having 1 to 6 carbon atoms or a carbonyl group, and a and b are each independently an integer of 0 to 4.

9. The method for producing a cyclic phosphazene compound having an oxaphosphorin ring-containing structure according to claim 8, wherein the azidated intermediate used in step 2 is a mixture of two or more types of the azidated intermediates.

10. The method for producing a cyclic phosphazene compound having an oxaphosphorin ring-containing structure according to claim 9, wherein the mixture of the azidated intermediates is obtained by using two or more types of the chlorodibenzoxaphosphorin-based compounds in step 1.

11. A resin composition comprising:
a resin component; and
one or two or more types of the cyclic phosphazene compounds having an oxaphosphorin ring-containing structure according to claim 1.

12. The resin composition according to claim 11, wherein the resin component is at least one selected from the group consisting of an epoxy resin, a phenol resin, an unsaturated polyester resin, a diallyl phthalate resin, a maleimide resin, a polyimide resin, a benzoxazine resin, a benzocyclobutene resin, a polyolefin resin, a styrene-based resin, a polyester resin, an aliphatic polyamide resin, a semi-aromatic polyamide resin, a polycarbonate resin, a polyphenylene ether-based resin, a polyarylate resin, and modifications of these resins.

13. A resin molded body comprising the resin composition according to claim 11.

14. An electric or electronic component comprising the resin molded body according to claim 13.

* * * * *